(12) United States Patent
Smith

(10) Patent No.: US 7,039,869 B2
(45) Date of Patent: May 2, 2006

(54) GLOBAL LAB SOFTWARE

(75) Inventor: Milton Smith, San Jose, CA (US)

(73) Assignee: Fuji Photo Film Co., Ltd., Kanagawa (JP)

( * ) Notice: Subject to any disclaimer, the term of this patent is extended or adjusted under 35 U.S.C. 154(b) by 671 days.

(21) Appl. No.: 09/782,608

(22) Filed: Feb. 14, 2001

(65) Prior Publication Data

US 2001/0050684 A1    Dec. 13, 2001

Related U.S. Application Data

(60) Provisional application No. 60/182,380, filed on Feb. 14, 2000.

(51) Int. Cl.
*G06F 3/00* (2006.01)
*G06T 5/00* (2006.01)
*G06K 15/00* (2006.01)

(52) U.S. Cl. ............... 715/716; 715/717; 715/748; 715/733; 345/581; 345/619; 358/1.18; 358/1.15

(58) Field of Classification Search ............... 345/717, 345/716, 764, 730, 732, 733, 740, 748, 771, 345/772, 780, 760, 619, 581, 589, 591, 600, 345/605, 625, 603, 626, 628, 649, 650, 654, 345/661, 667; 715/500, 500.1, 513, 517, 715/520, 523–524, 526, 528; 358/1.2, 1.6, 358/1.9, 1.13, 1.15, 1.18
See application file for complete search history.

(56) References Cited

U.S. PATENT DOCUMENTS

| | | | |
|---|---|---|---|
| 4,546,390 A | 10/1985 | Konishi et al. | 360/10.3 |
| 4,833,625 A * | 5/1989 | Fisher et al. | 345/661 X |
| 4,903,132 A | 2/1990 | Yamawaki | 358/209 |
| 4,914,746 A | 4/1990 | Nishi et al. | 358/334 |
| 5,018,017 A | 5/1991 | Sasaki et al. | 358/209 |
| 5,032,927 A | 7/1991 | Watanabe et al. | 352/335 |
| 5,034,804 A | 7/1991 | Sasaki et al. | 358/41 |
| 5,138,459 A | 8/1992 | Roberts et al. | 358/209 |
| 5,164,831 A | 11/1992 | Kuchta et al. | 358/209 |
| 5,191,406 A * | 3/1993 | Brandestini et al. | 345/603 X |
| 5,383,027 A * | 1/1995 | Harvey et al. | 715/520 X |
| 5,576,757 A | 11/1996 | Roberts et al. | 348/207 |
| 5,685,002 A * | 11/1997 | Sano | 715/517 |
| 5,983,236 A * | 11/1999 | Yager et al. | 345/716 X |
| 6,094,219 A | 7/2000 | Roberts et al. | 348/207 |
| 6,233,010 B1 | 5/2001 | Roberts et al. | 348/220 |

(Continued)

OTHER PUBLICATIONS

Corel Photo-Paint User's Manual, Corel Corporation 1992, pp. 1-4, 58-62, 109-111.*

*Primary Examiner*—Raymond J. Bayerl
(74) *Attorney, Agent, or Firm*—Birch, Stewart, Kolasch & Birch, LLP

(57) ABSTRACT

A computer program and method are used in connection with a system article of manufacture, operator-system interface, and propagated signal for processing digital images, which are extremely flexible in terms of availability, connectability, and the number and types of receivable input formats and outputs. The computer program, article of manufacture, propagated signal, system, and operator/system interface permit users to input image information in a wide variety of formats, input the image information in many different ways, process the image information utilizing various techniques, in various languages, and produce outputs in a plurality of different format types and as a plurality of different products.

45 Claims, 27 Drawing Sheets

U.S. PATENT DOCUMENTS

| | | | |
|---|---|---|---|
| 6,323,899 B1 | 11/2001 | Roberts et al. | 348/220 |
| 6,369,908 B1* | 4/2002 | Frey et al. | 358/1.15 |
| 6,496,222 B1 | 12/2002 | Roberts et al. | 348/231 |
| 6,744,529 B1* | 6/2004 | Winter et al. | 358/1.15 |
| 6,788,425 B1* | 9/2004 | Ohtsuka et al. | 358/1.13 |
| 6,967,737 B1* | 11/2005 | Kinjo | 358/1.15 |

* cited by examiner

GLOBAL LAB SOFTWARE

CROSS-REFERENCE TO RELATED APPLICATIONS

This application claims the benefit under 35 U.S.C. § 119(e) of U.S. Provisional Application of Milton Smith entitled "Global Lab Software", Ser. No. 60/182,380, filed on Feb. 14, 2000, the entire contents of which is incorporated by reference herein.

BACKGROUND OF THE INVENTION

1. Field of the Invention

The present invention relates generally to image processing, and more particular to the remote and local processing of digital picture image data.

2. Description of the Related Art

There are many conventional techniques and systems for developing image data and processing digital images. However, most of these conventional systems are limited in their flexibility in terms of availability, connectability, a wide variety of receivable input formats, and their variety in potential output. This lack of flexibility has made it fairly difficult for users to process digital image files in a variety of input formats, into a plurality of different types of outputs.

SUMMARY OF THE INVENTION

The present invention solves these problems by providing a system, software, hardware, and an operator-system interface, which permit users additional flexibility regarding image processing. The system, software, hardware, and OSI interface permit a user to input image information in a wide variety of formats, input the image information in many different ways, process the image information utilizing various techniques, in various languages, and produce outputs in a plurality of different format types and as a plurality of different products.

DETAILED DESCRIPTION OF THE PREFERRED EMBODIMENTS

Figure 1:
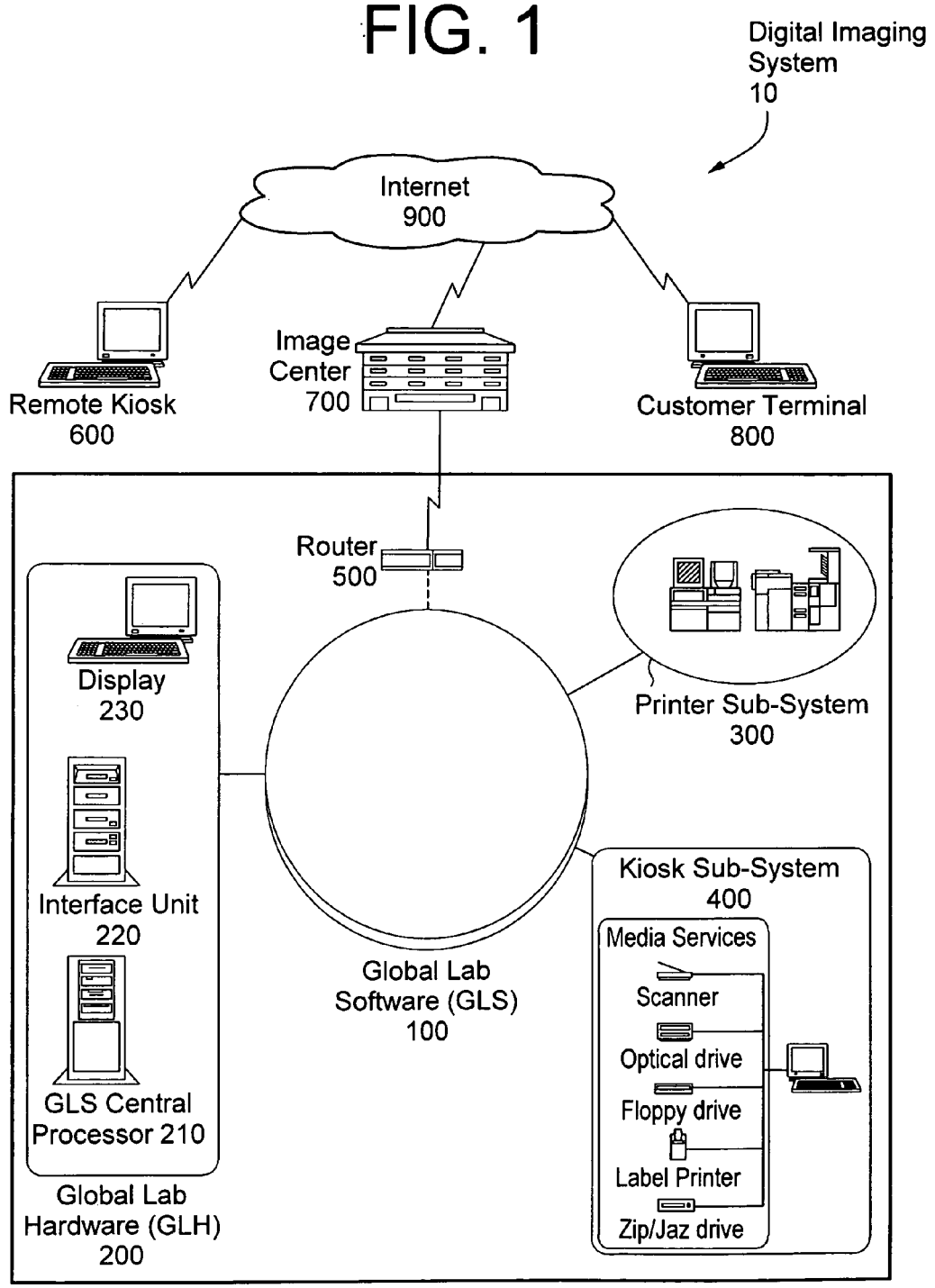
FIG. 1 illustrates a system of the present invention in one exemplary embodiment.

1 Global Lab Software Overview 1.1 Objective

The present invention provides inexpensive high quality photo-color printing service to the general public from a digital image file. To accomplish this, the present invention includes Global Lab Software (GLS) 100 (illustrated in FIG. 1) which receives user order commands, stores and processes customers' digital images, and controls the quality of the print operation. GLS 100 permits the addition of new input/output devices and is adaptable to provide multi-language support for different countries. GLS 100 can be network connected, can store the customer's digital images at an Image Center 700, and can output digital image files (including printer controls) to different input/output devices with a broad range of service offerings.

1.1.1 Customer Services

GLS 100 provides the following customer services:

print service media input network reprint service net registration service (upload to the Internet)

CD-R writing service

CD-R reprint service floppy disk writing service

Zip/Jaz writing service 1.2 GLS 100 Applicability

GLS 100 is usable with a wide range of system configurations from small-scale, in-store platforms to large-scale lab environments. GLS 100's scalability is accomplished by increasing the number of CPU's, memory size, disk storage, and other peripherals within a single server.

GLS 100 also may interact with existing digital imaging manager (DI Manager) software and digital imaging architecture software to enable automatic image processing and color-space correction for a wide variety of digital products.

GLS 100 also performs image optimization including:
color correct selected images for red, green, and blue (RGB) and density;
zoom and crop;
preview corrected images;
rotate image or pan image; and
"auto scan" an entire roll of film.

GLS 100 can also interface seamlessly with existing print systems, such as for example, the Fuji Frontier 350/370 Printing Sub-system. GLS 100 can also interface with a broad range of digital image input and output devices.

1.2.1 Overview of Services

GLS 100 may perform the following basic functions:
1. print service media input including:
index print of digital still camera (DSC) images;
3, 4, 5 and 8 inch wide prints—printed to a network printer;
up to 40 images on a sheet;
multiple input formats accepted including Exif-JPG, JPG, BMP, FPX, TIFF, GIF, PCD, PCT, COS, DPC, CAM;
DSC images can be transferred to an Image Center 700, CD-R, floppy disk, Zip/Jaz, or printer; and
the Digital Print Order Format (DPOF) standard format.
2. network registration service and network reprint service
3. CD-R media service including in-store writing Image CD and reprint from CD-R
scanned film, single roll per CD-R;
DSC images, one CD per media card;
images format of 4base JPEG (approx. 500 Kbytes per image);
ISO 9660 "Hybrid" CD-ROM for Mac and Windows;
Up to 750 images on a CD-ROM; and
provide an image viewer.
4. floppy disk media service—images on a photo floppy
3.5" PC formatted (1.44 MB) floppy disk;
maximum of 30 images per disk;
image format 1Base JPEG (approx. 30 Kbytes per image); and
provide an image viewer.
5. Zip/Jaz Media Service
100/250 Zip formatted;
1 Gb/2 GB Jaz formatted;
number of images;
50 images for 100 MB Zip;
150 images for 250 MB Zip;
500 images for 1 GB Jaz;
1000 images for 2 GB Jaz;
image format 4base JPEG (approx. 500 K Bytes per image); and
provide an image viewer.

The services performed by the GLS 100 will be described in more detail below.

1.3 Digital Imaging System

The digital imaging system 10, which includes GLS 100, is illustrated in FIG. 1. The digital imaging system 10 includes the GLS 100, Global Lab Hardware (GLH) 200, a printer sub-system 300, and a Kiosk sub-system 400. Each of the GLS 100, GLH 200, printer sub-system 300, Kiosk sub-system 400, and a router 500, may be co-located as evidenced by the rectangular box illustrated in FIG. 1. The digital image system 10 may also include remote elements, such as a remote Kiosk 600, an image center 700, and a customer terminal 800, each of which may be connected to the GLS 100 via the router 500 and/or the image center 700 and the internet 900.

1.4 GLH 200

The GLH 200 hardware illustrated in FIG. 1 includes a GLS central processor 210, an interface unit 220, and a display 230. The GLS central processor 210 may include any number of processors operating at any acceptable speed, including the necessary RAM, ROM, and other memory, input unit, such as a keyboard or mouse, communications card and/or communication elements. The interface unit 220 permits the GLS central processor 210 to interface with the various perpheral devices. In one embodiment, the interface unit is an external SCSI unit. The interface unit also permits the GLS central processor 210 to interface with the display 230. The display 230 may be a touch screen monitor, a color monitor and/or a flat screen display. As set forth above, the GLH 200 is usable with a wide range of system configurations. The amount of processing power, memory, memory types, other peripherals, input modes, and output modes, depends largely, on the capabilities necessary for each individual configuration. The GLH hardware 200 also utilizes standard software components such as an operating system, such as Microsoft Windows NT Workstation V4.0. Symantec PC Anywhere V8.03, Oracle 8.0 Personal Edition, the GLS 100, and Adaptec Easy CD. An uninterruptable power system, such as APC 1000 Smart UPS should also be utilized.

The GLS 100 may accept image input from multiple networked devices and sources such as Zip Disk (Zip/Jaz), Floppy Disk, Flash ATA (PC Card), Smart Media, Compact Flash, Magneto-Optical Disk, CD-ROM, and the Internet.

The GLS 100 accepts, among others, the following industry standard image file formats such as FPX, TIFF, JPEG, Exif, Fuji DiPP-raw, GIF, BMP (Windows NT/95), PCD, PCT, COS, DPC, and CAM.

1.5 Global Lab Software (GLS) 100

Figure 2:
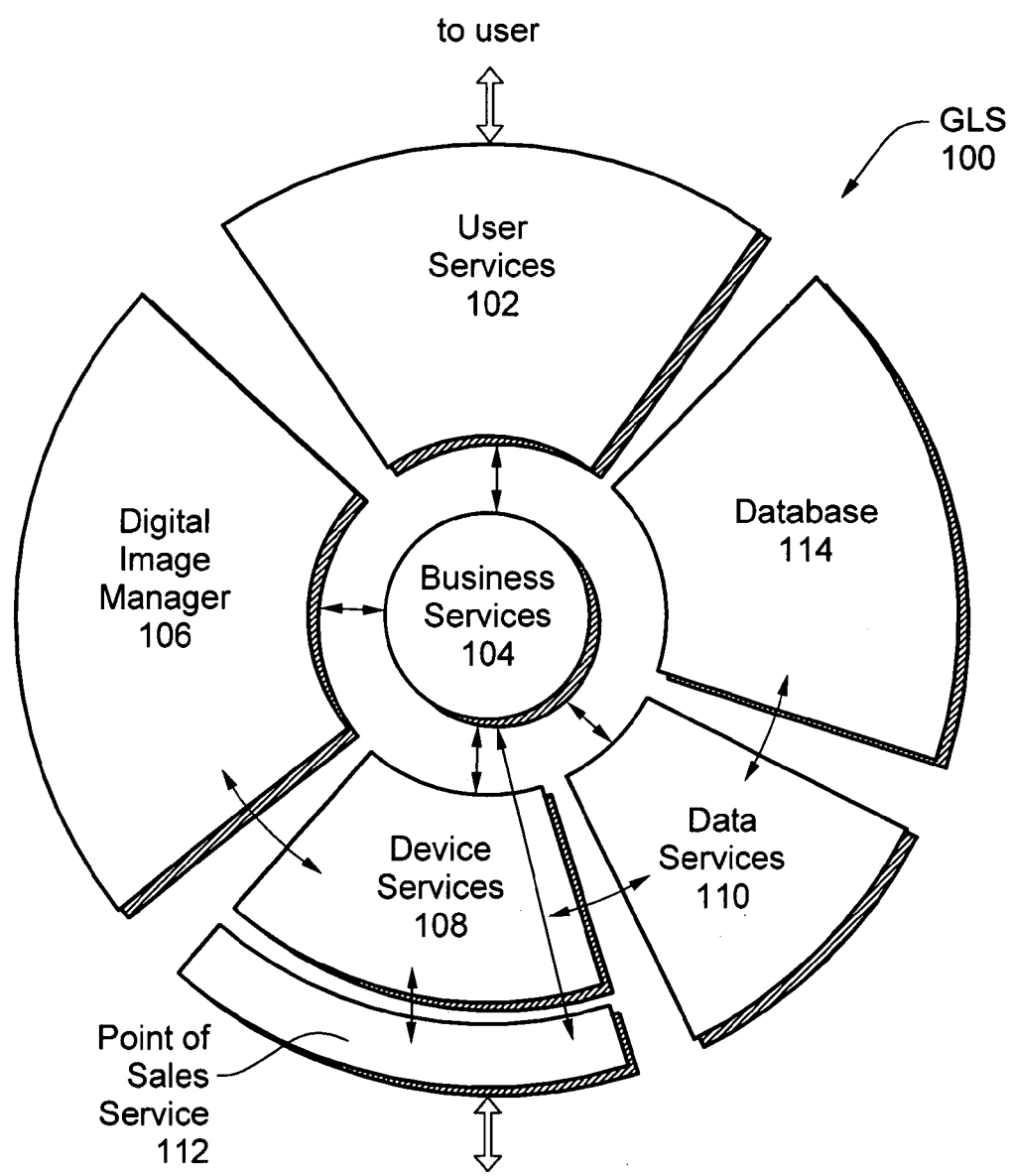
FIG. 2 illustrates the main modules and the interaction therebetween of the global lab software (GLS) in one exemplary embodiment of the present invention.

GLS 100 includes several programming modules, including a user services module 102, a Business Services module 104, an Image Manager module 106, a Device Services module 108, a Data Services module 110 which work together seamlessly to perform the above functions. The Device Services module 108 may also include a Point of Sales Service module 112. The GLS 100 may also include a data base 114. In one embodiment, the programming modules function on a single hardware server. The controlling module is the Business Services Module 104. FIG. 2 illustrates the GLS 100 modules.

1.5.1 User Services Module 102

The User Services module 102 provides the front-end user interface to the image workstation operator with a friendly graphical interface display and touch-screen sensitive selection to input information. In one embodiment, the User Services module 102 is a graphical user interface. Input data is processed and sent to the Business Services module 104. The User Services module 102 also provides password protected administrative services for setup and configuration. Two types of data are received and processed: the image data (in the various formats described in Secton 1.4) and customer order data. The customer order formats are defined below in Section 5.

1.5.2 Business Services Module 104

The Business Services module 104 receives the User Services module 102 requests, validates the request and processes the orders. The Business Services Module 104 contains format conversion module to convert BMP, FPX or Exif-Jpeg formats to a common format (in one example, DiPP-Raw format) which are then passed to the Digital Image Manager module 106.

1.5.3 Digital Image Manager Module 106

The Digital Image Manager (DI Manager) module 106 performs color-space correction (SRGB) while running in a background mode and outputs image data to the Printer Sub-System 300. In one embodiment, the Printer Sub-System 300 is a Fuji Frontier Printer, which interacts with the DI Manager module 106 via a query order-polling sequence. In one example, the DI Manager 106 is a Fuji Digital Imaging (F-DIA) image manager.

1.5.4 Device Services Module 108

The Device Services module 108 receives commands from the Business Services module 104 and uses the Data Services module 110 to communicate with the database 114 to store and retrieve images locally. The Device Service module 108 also transmits image data to the printer sub-system 300. The image data transmitted to the Device Services module 108 may originate from any one of the Kiosk Sub-System 400, a remote Kiosk 600, customer terminal 800, or any other connected location.

1.5.5 Data Services Module 110

The Data Services module 110 receives commands from the Device Services module 108 and structures the data to be stored in the database 114. On readout from the database 114, the Data Services module 110 parses the data into image data and customer order data.

1.5.6 Operational Data Flow

The operational data flow between GLS modules, is shown by arrows in FIG. 2 and is further described below in conjunction with FIGS. 1 and 2.

A service request and the resulting flow of image data can be initiated by an end-user at customer terminal 800 via the Internet 900, an Image Center operator processing work order from the Image Center 700, or a remote Kiosk initiated service request from the remote Kiosk 600 via the Internet 900. In each case, the resulting GLS Order File (which is discussed in detail in Section 3.1) and the transfer of image data is processed by GLS 100 before it is stored.

In more detail, the User Services module 102 provides a graphical user interface (GUI) sub-module for communication with the user, via display 230. The user creates an order specifying input and output media type and, if the order is to be printed, the size of the print.

The order file and image file, are received and validated by the GUI sub-module of the User Services module 102, and then passed to the Business Services module 104. As is evident, the Business Services module 104 controls many of the GLS 100 data flow operations. The Business Services module 104 processes the order file and passes the order file and image file to the Data Services module 110, which further passes the order file and image file to the Device Services module 108. If the order is to be stored locally, the Data Services module 110 also passes both files to the database 114, which stores and retrieves the data as necessary. In one example the database 114 is an Oracle™ 8.0 personal edition. Oracle™ 8.0's strength is it's capability to store and retrieve data reliably and it's support of the Unicode Character Set which supports multi-languages.

If the image data needs to be translated to another format, the Business Services module 104 sends the image data to the Digital Image Manager (DI Manager) module 106. The DI Manager module 106 performs conversion from BMP, FPS or Exif and outputs the image in a standard (in one example, DiPP-Raw) format. The DI Manager Module 106 performs any necessary color correction based on the input type-format data via API calls. After the DI Manager Module 106 processes the image data, the image data can be passed to the Device Services Module 108, then to the Data Services Module 110 to be stored in the database 114, or sent to the printer sub-system 300 for printing.

The DI Manager Module 106 does not communicate with the printer sub-system 300 directly, but rather the printer sub-system 300 uses a polling technique to query orders and obtain the specific order information from the DI Manager Module 106 when the printer sub-system 300 requires the information. The DI Manager Module 106 may be a client, sitting on GLS 100 and running in the background.

1.6 Global Lab System Hardware (GLH 200) Configuration

Figure 3:
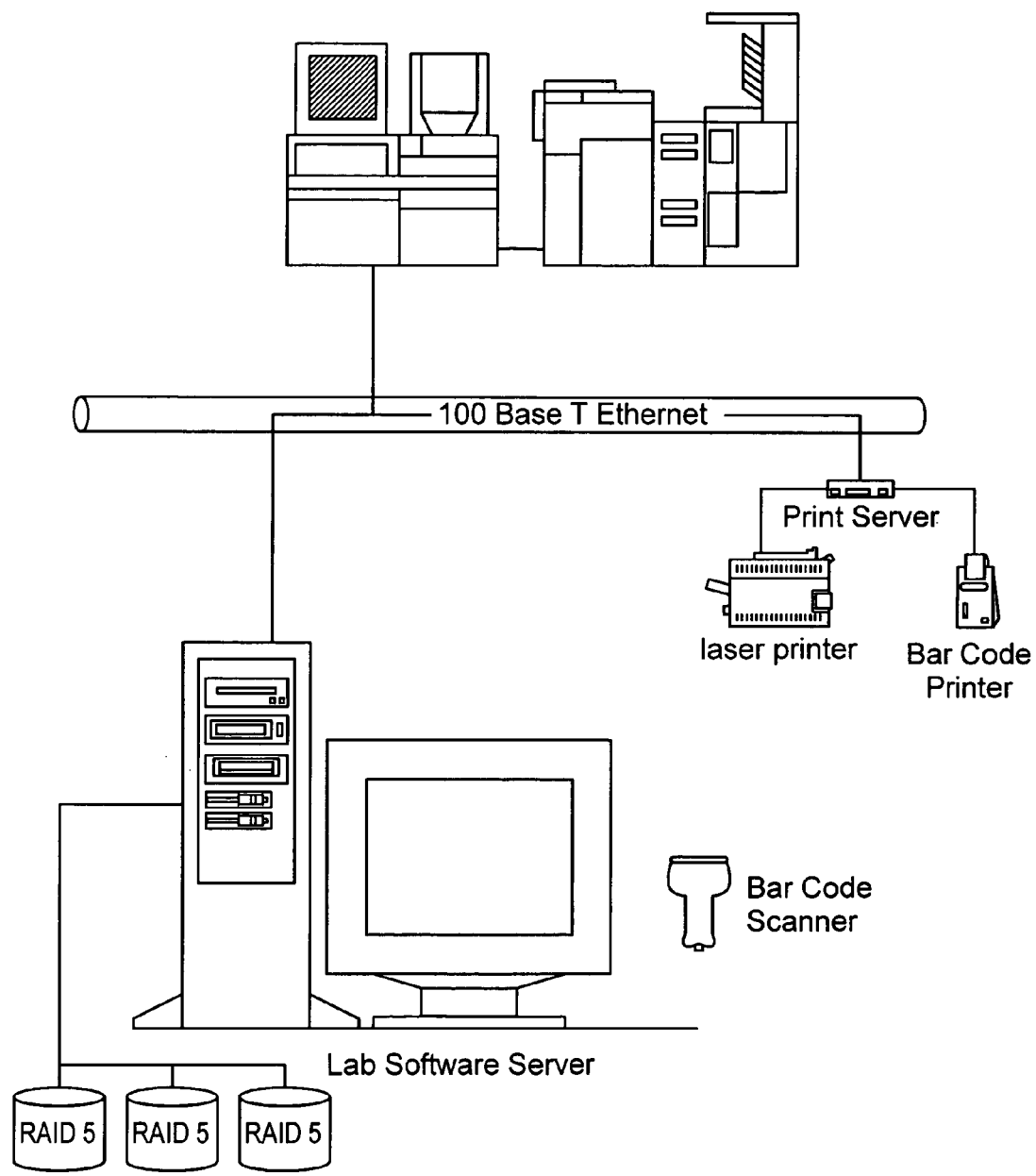
FIG. 3 illustrates a hardware arrangement of the global lab (GLH) hardware in one exemplary embodiment of the present invention.

FIG. 3 illustrates the GLH 200 hardware in more detail.

1.7 Universal Kiosk

Figure 4:
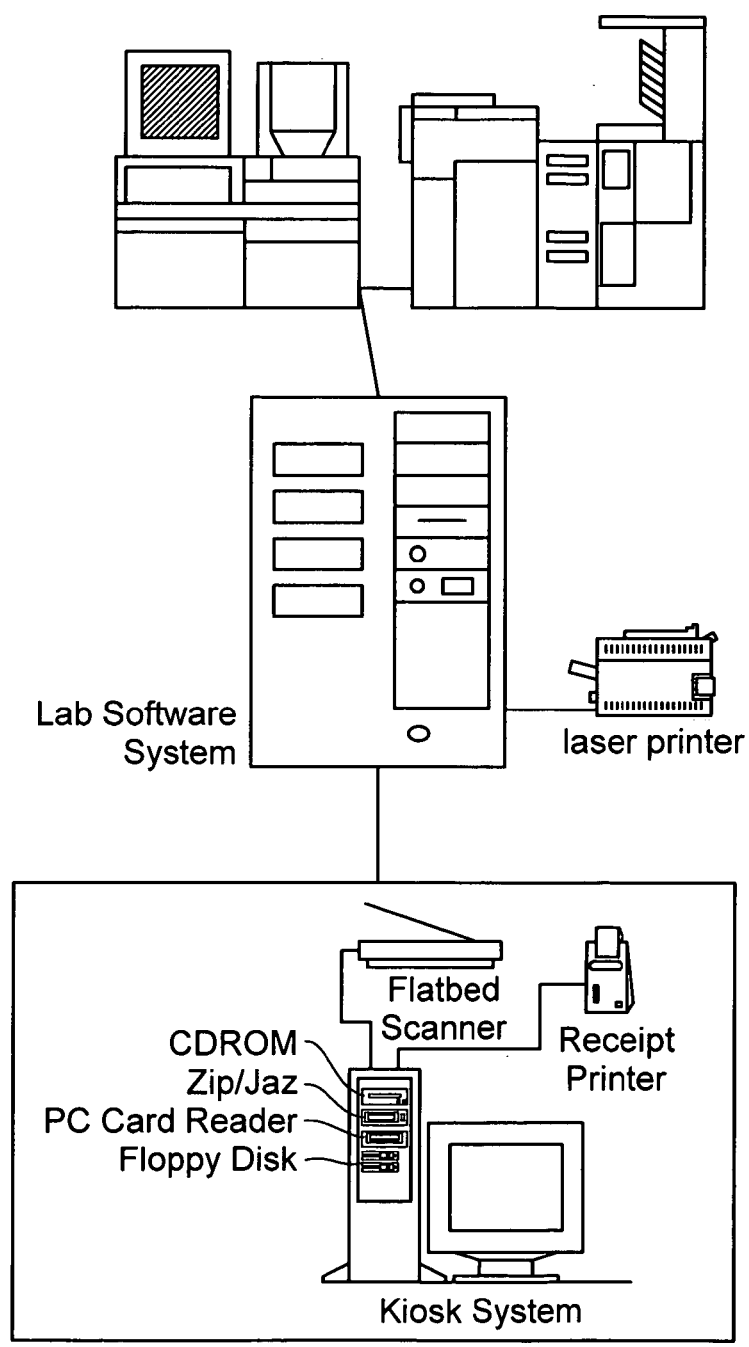
FIG. 4 illustrates a hardware arrangement of the Kiosk sub-system in one exemplary embodiment of the present invention.

FIG. 4 illustrates the kiosk 400/600 hardware in more detail.

1.8 Remote Initiated Service Request

FIGS. 5–10 illustrate the data flow and flow charts for work-flow for order information processing and image format processing originated by:

1. a service request from the Image Center 700 where the user uploads a processed order;
2. a service request from remote Kiosk 600, where the user uploads image and order information; and
3. a service request from customer terminal 800, where the user inputs image and order information via a PC application.

Figure 5:
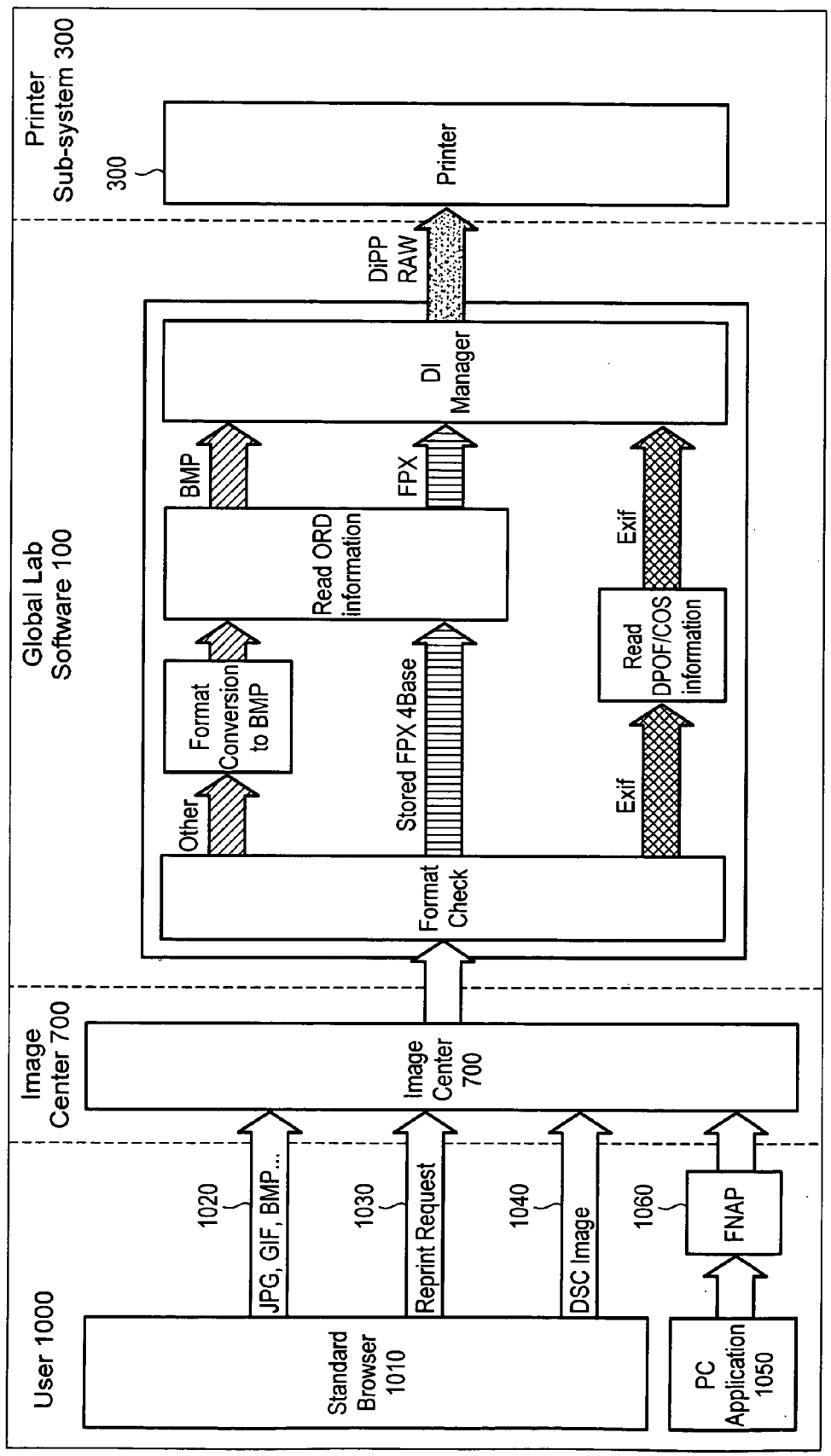
FIG. 5 illustrates the image data flow for a remote initiated service request in one exemplary embodiment of the present invention.

1.8.1 The Image Data Flow for Remote Initiated Service Request as Illustrated in FIG. 5 is as Follows.

A user 1000 uploads images 1020 created on a PC for printing on the printer sub-system 300. Image formats accepted remotely may include: Exif-JPG, JPG, BMP, FPX, TIFF, GIF, PCD, PICT, COS, DPC, and CAM. The user 1000 requests reprints (using a standard web browser 1010) of an image scanned and uploaded by GLS 100 by sending a reprint request 1030. The user 1000 may also upload images 1040 taken from a DSC camera, where the image format (such as EXIF), should be compatible for printing on the printer sub-system 300 (for example, a Fuji Frontier Printer).

The user 1000 can also create images using a PC application 1050 and upload for printing on the printer sub-system 300 using (FNAP) 1060. The FNAP module is described in detail in copending U.S. application Ser. No. 09/372,750, filed Aug. 11, 2000, the entire contents of which are hereby incorporated by reference.

Once received at the Image Center 700, the data is then routed via a transmission line to a server running GLS 100, where the primary image processing and color correction takes place before it is sent to the printing sub-system 300.

As illustrated in FIG. 5, image format conversion takes place in a Format Conversion module. If the data is in FPX 4Base format or BMP, the Order Information is read before it is passed to the DI Manager module 106. If the data is in Exif format, it is sent to a DSC Module 118 for reading DPOF (or COS) information, before it is color corrected by the DI Manager module 106 (which converts to a standard format such as DiPP-Raw) and stored in the database 114. From there, the image data is sent to the printer sub-system 300 or output to any specified media device.

1.9 Internet Initiated Work Flow

Figure 6A:
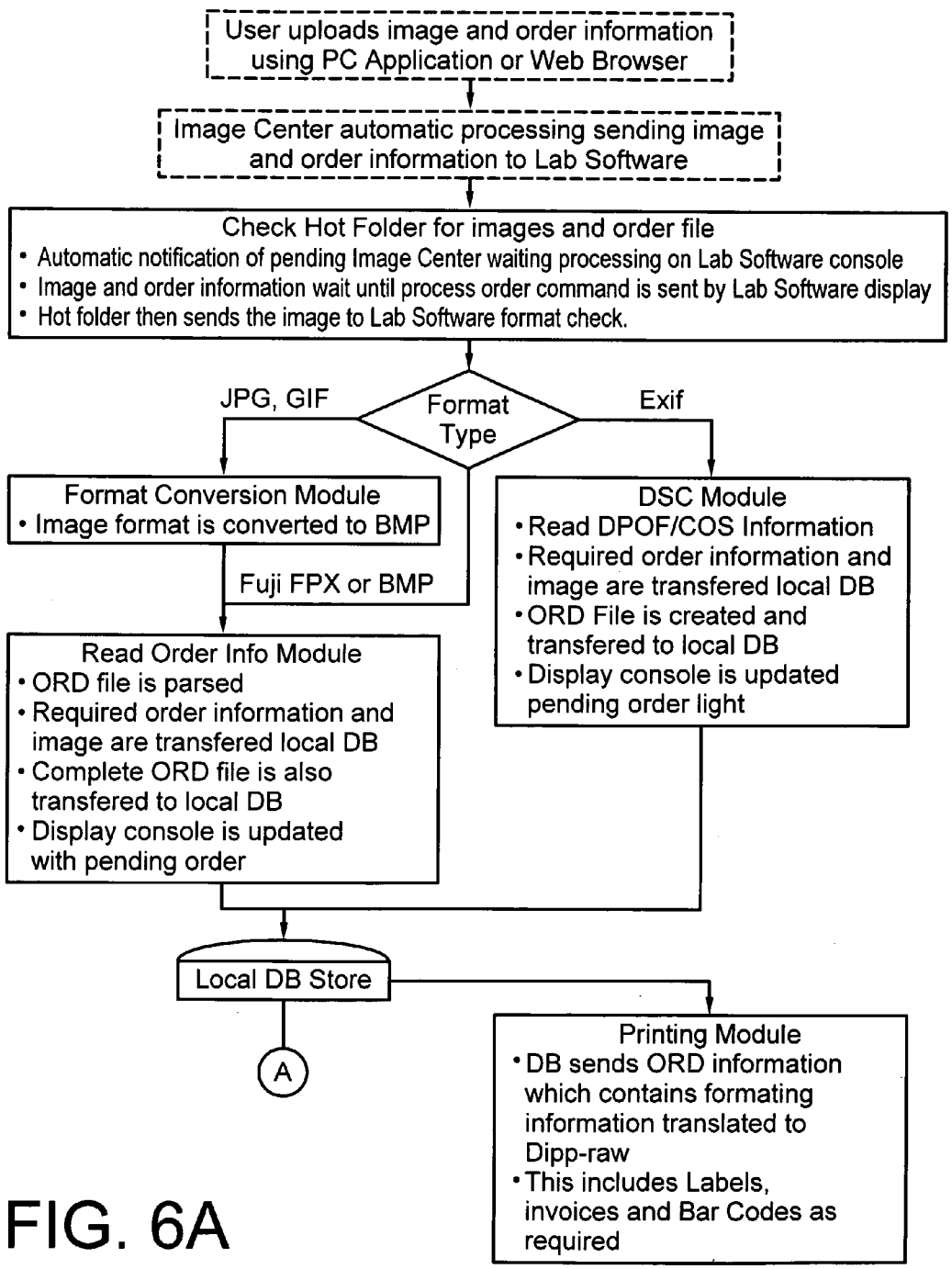
FIGS. 6A and 6B illustrate a flow chart of the actions taken to process a remote initiated service request in one exemplary embodiment of the present invention.
Figure 6B:
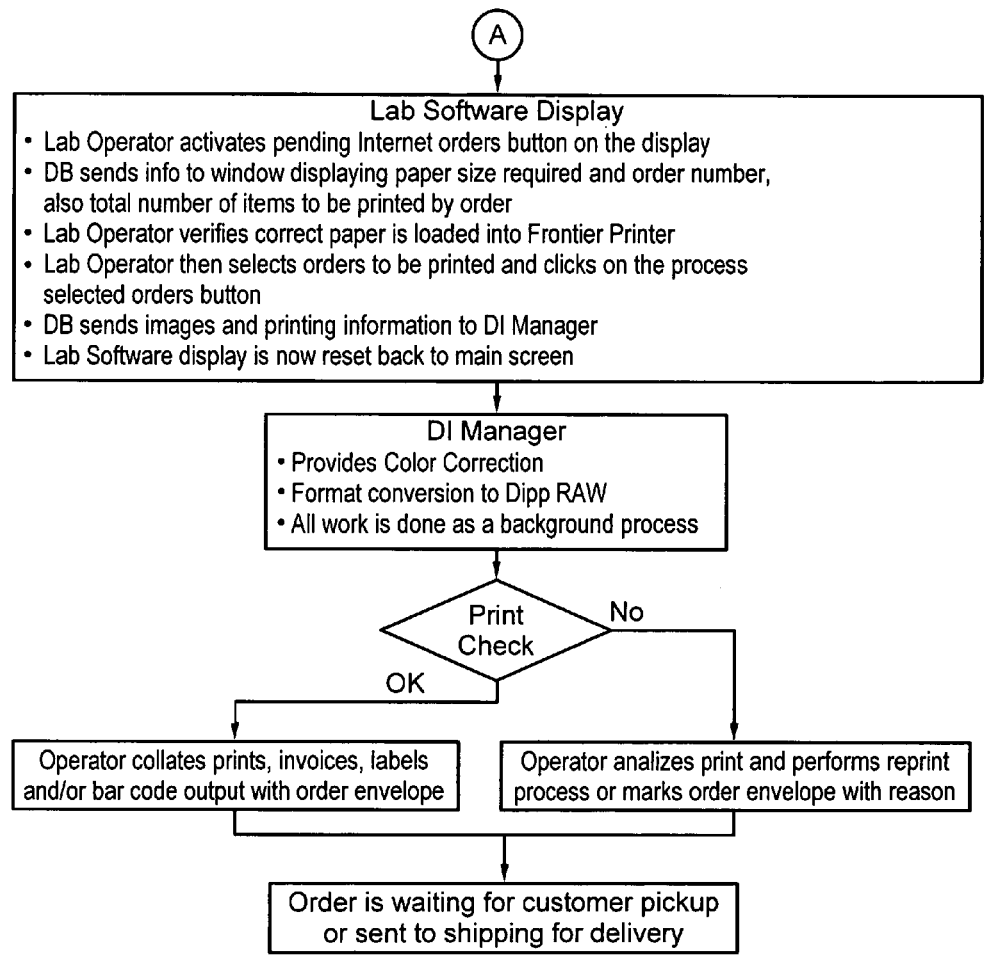

FIG. 6 illustrates the actions taken to process a remote initiated service request.

Figure 7:
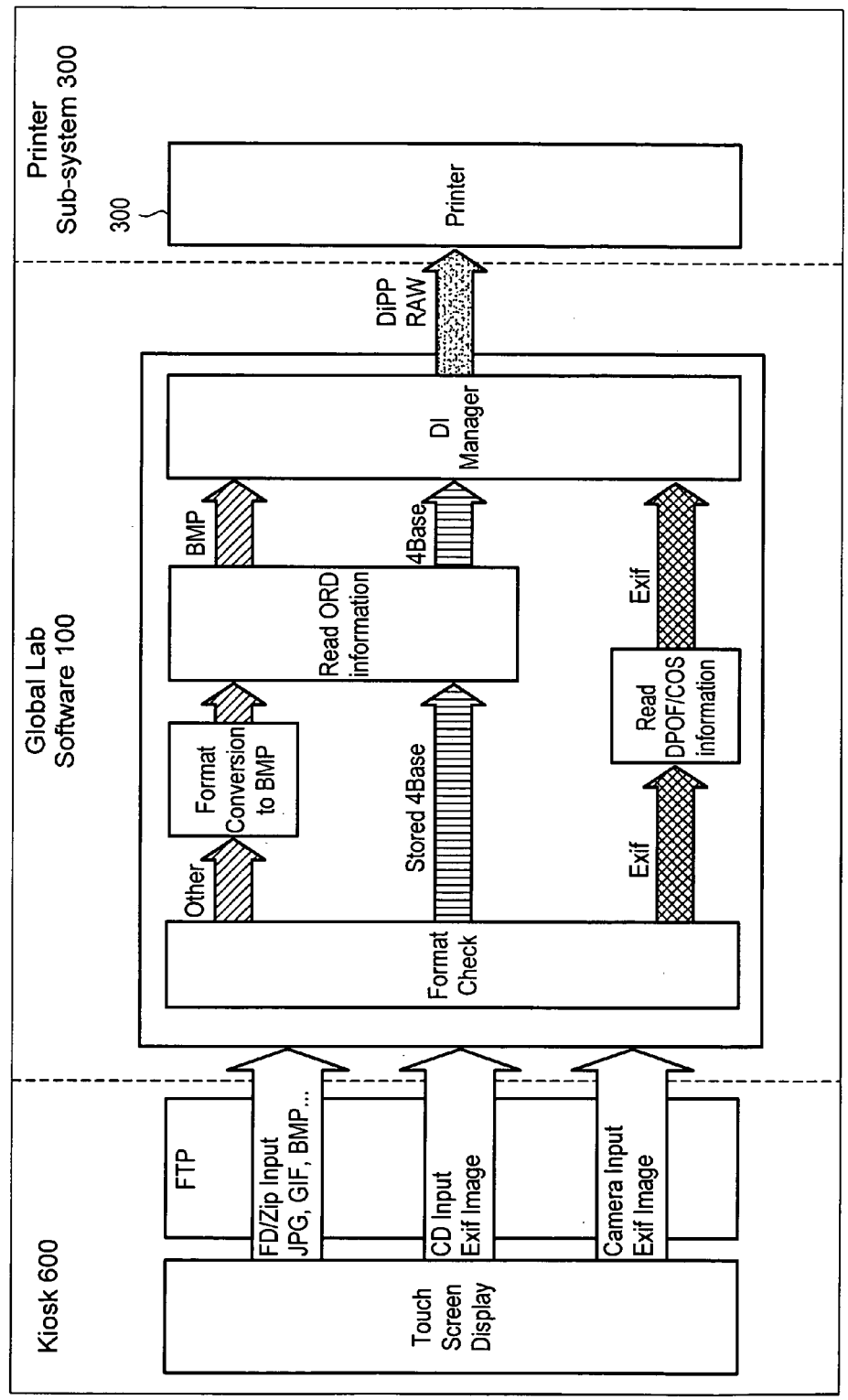
FIG. 7 illustrates the image data flow for a remote Kiosk initiated service request in one exemplary embodiment of the present invention.

1.10 Remote Kiosk 600 Initiated Service Request 1.10.1 The Image Data Flow for a Remote Kiosk 600 Initiated Service Request as Illustrated in FIG. 7 is as Follows:

The user 1000 creates images on a PC and/or the internet 900, for printing on the printer sub-system 300. The image may be in Exif-JPG, JPG, BMP, FPX, TIFF, GIF, PCD, PICT, COS, DPC, or CAM image formats.

The user 1000 inserts media into the Kiosk 600 and uses an input device (for example a touch screen) to select images and order information. The media may be a DSC media, a zip disc, a floppy disc, a compact disc, or other similar medium.

Software at the Kiosk 600 then sends the customer images and order file to GLS 100 (via FTP or other similar standard) for printing on the printer sub-system 300.

1.11 Kiosk Initiated Data Flow

Figure 8A:
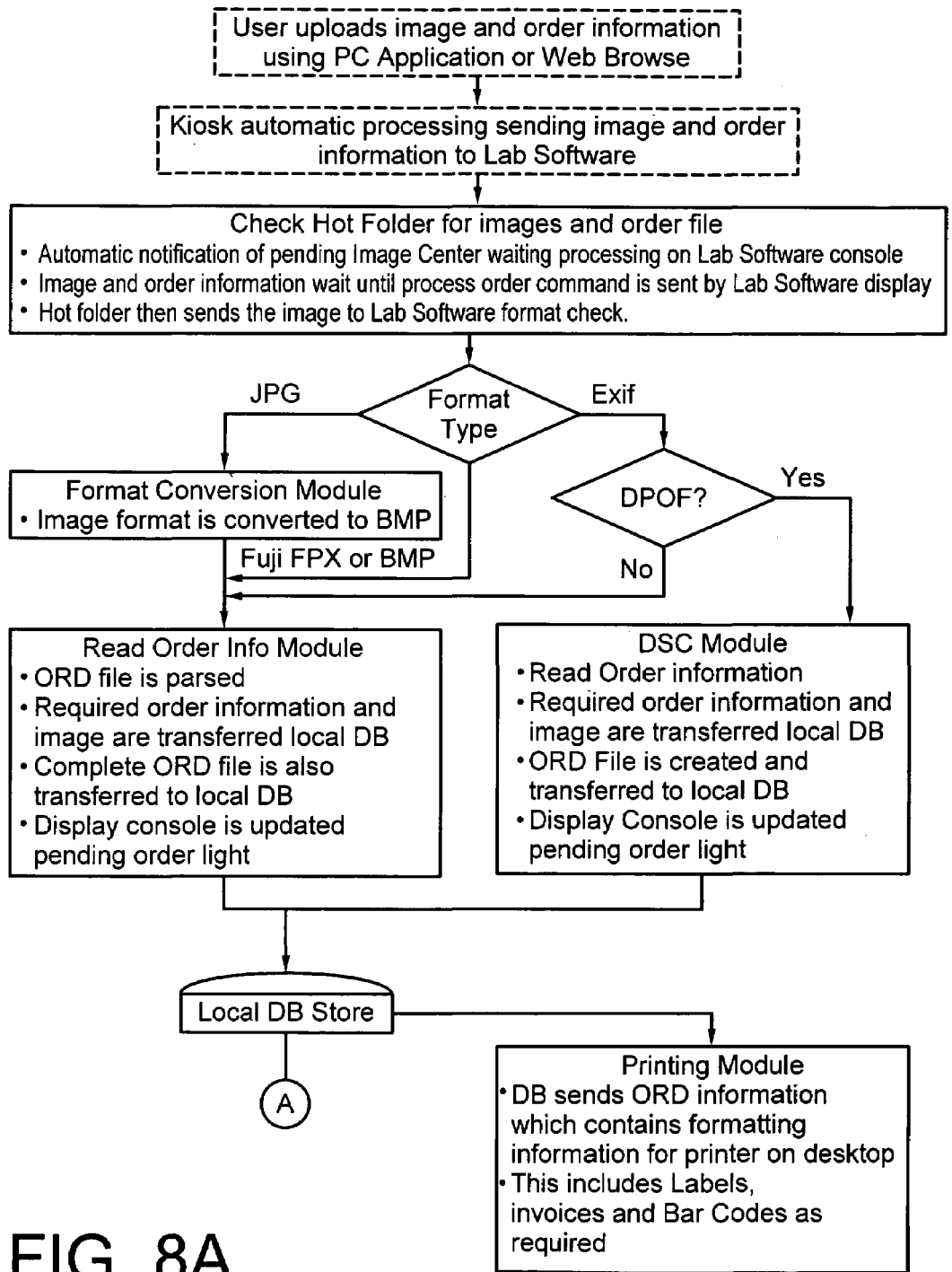
FIGS. 8A and 8B illustrate a flow chart for a remote Kiosk initiated service request in one exemplary embodiment of the present invention.
Figure 8B:
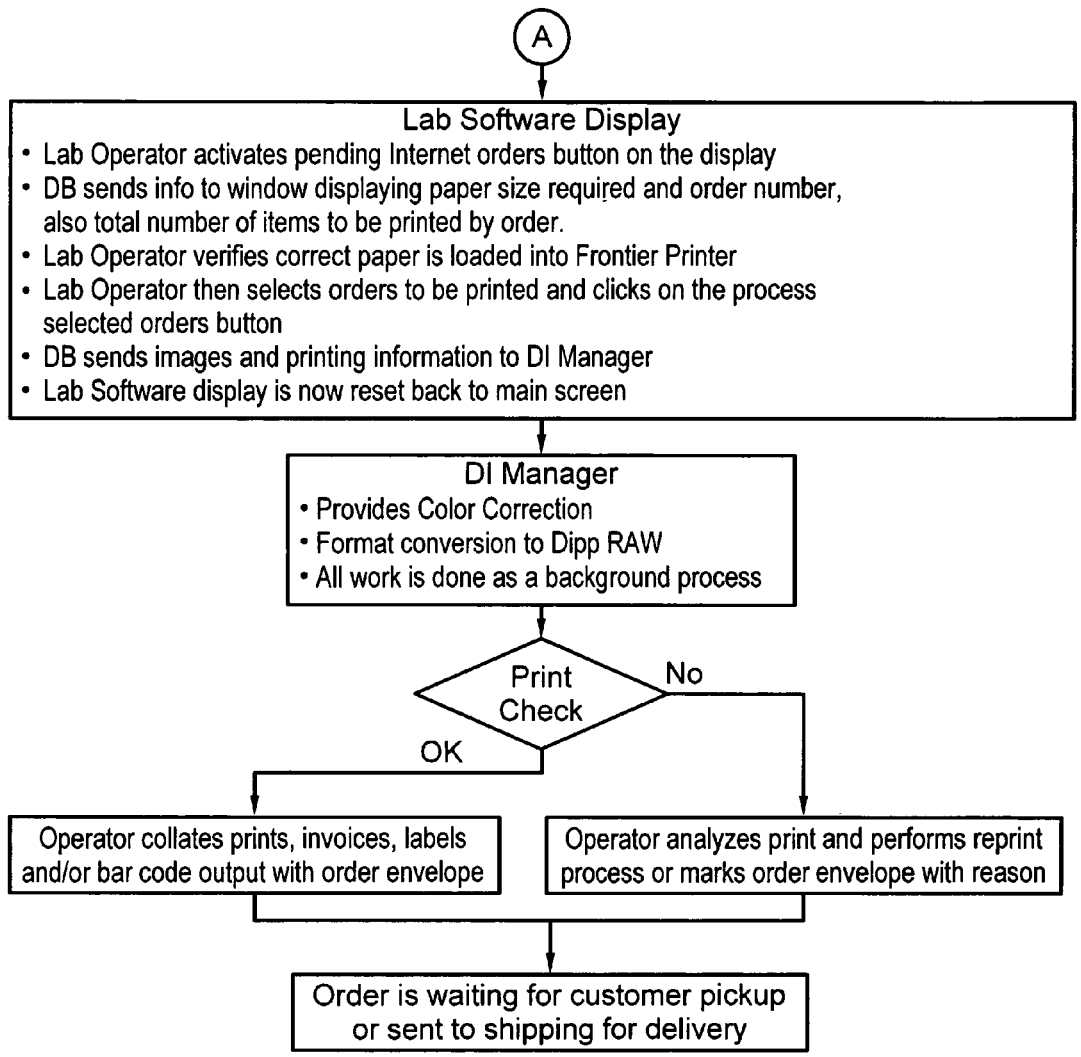

FIG. 8 illustrates the actions taken to process a remote kiosk initiated service request.

1.12 Digital Media Input Initiated Service Request

Figure 9:
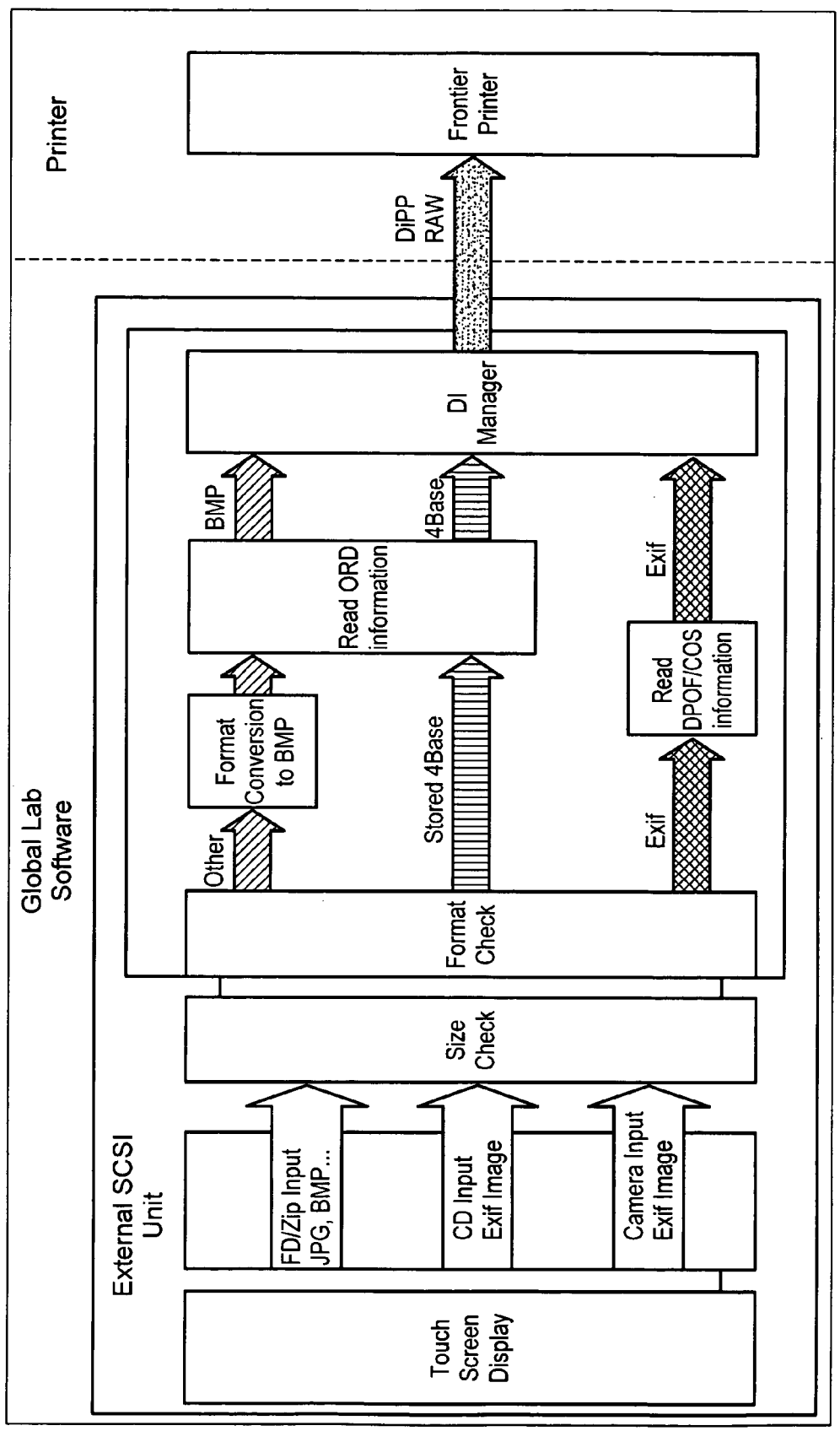
FIG. 9 illustrates the image data flow for a digital media input initiated service request in one exemplary embodiment of the present invention.

The image data flow of a digital media input initiated service request as illustrated in FIG. 9 is as follows:

A user 1000 creates images on a PC and/or the internet 900, for printing on the printer sub-system 300. Image formats may include Exif-JPG, JPG, BMP, FPX, TIFF, GIF, PCD, PICT, COS, DPC, or CAM.

A lab operator downloads the images from the Image Center 700 and selects images and order information. The lab operator inserts a medium and uses an input device (for example a touch screen) to select images and order information. The media may be a DSC media, a zip disc, a floppy disc, a compact disc, or other similar medium.

The GLS 100 sends the image for printing on the printer sub-system 300.

1.13 Digital Media Input Initiated Work Flow

Figure 10A:
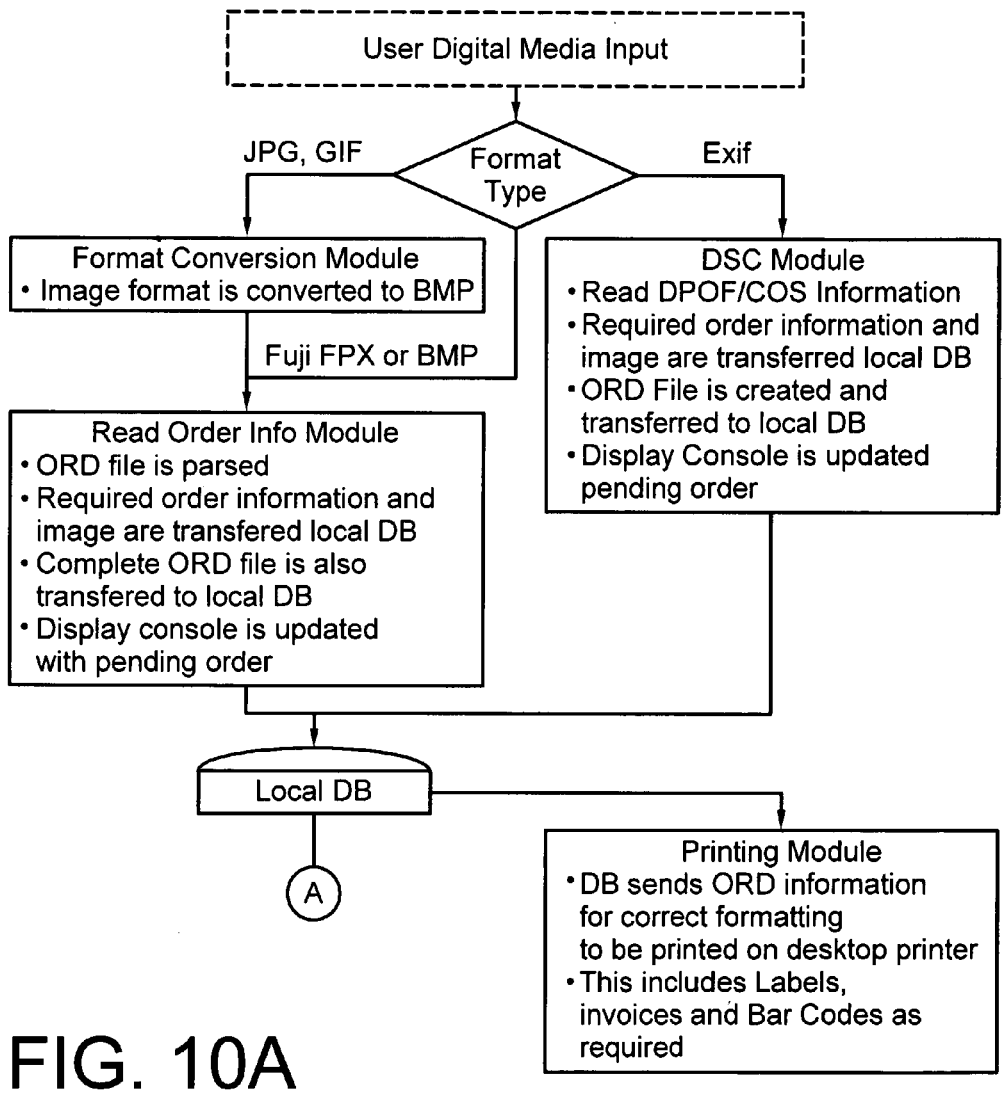
FIGS. 10A and 10B illustrate a flowchart for a digital media input initiated service request in one exemplary embodiment of the present invention.
Figure 10B:
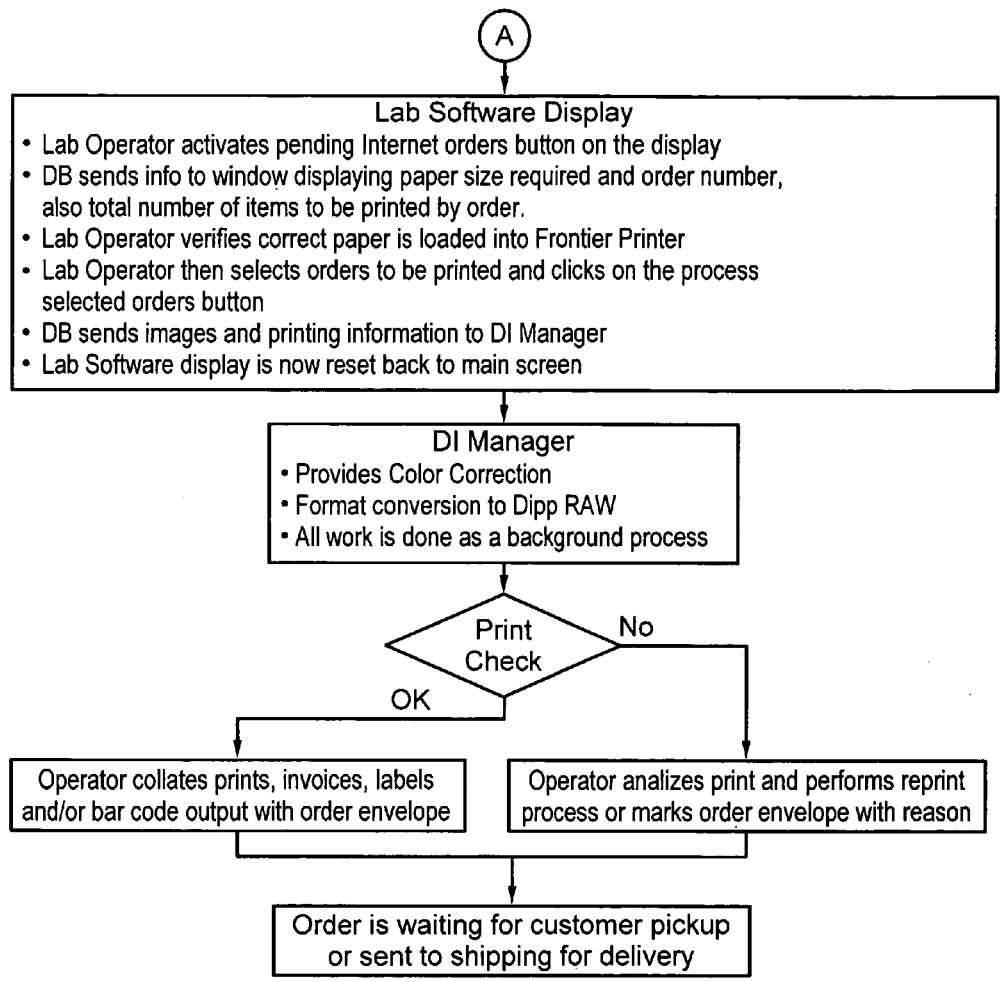

FIG. 10 illustrates the actions taken to process a digital media input initiated service request.

2 Detail Media and Formats

2.1 Input Media Type

The following are exemplary input media types for the Digital Imaging System 10: CD-R (CD-R74 with CD-ID bar-code), Floppy Disk (FD) (1.44 MB with DOS and Mac standard format), PC card, Smart Media, Compact Flash, Zip Drive (100 MB and 250 MB with DOS/Windows and Mac standard), Jaz Drive (1 GB and 2 GB), and HiFD (200 MB Floppy Disk).

2.2 Output Media Type

The following are exemplary output media types for the Digital Imaging System 10: CD-R (CD-R74), FD (1.44 MB with DOS/Windows), Zip Drive (100 MB and 250 MB with DOS/Windows), and Jaz Drive (1 GB and 2 GB).

2.3 Input File Format

The following are exemplary input file formats for the Digital Imaging System 10: FPX (1Base or 4Base), JPG (JPEG), Exif-JPG (Exif Ver.1.0, 2.0, 2. 1, R98), Exif-TIFF, TIFF, BMP, COS order file, FUJI-DPC order file, Fuji order file specification for F-DI media print service, GIF, DPOF (Digital Print Order Format), DPOF (the GLS 100 Order File format), PhotoCD, and PICT for MAC.

2.4 Output File Format

The following are exemplary output file formats for the Digital Imaging System 10: FPX (4base) and JPG (4base and 1base). These output file format types are selectable; however, for Floppy Disk (FD) writing, normally only JPG is used.

2.5 Output Services 2.5.1 Digitized Images may be Output to CD-R, Zip, Jaz, FD, and MO.

Exemplary details of image digitizing is set forth below.

2.6 Detailed Image Digitizing Parameters 2.6.1 CD-R Zip/Jaz Writing

Film or slide media can be digitized using the printer sub-system 300 (in one example, a Frontier 350/370). Data is converted to FPX or Exif-JPG and written to CD-R, Zip or Jaz drive in accordance with the exemplary parameters of Table 1.

TABLE 1

| | |
|---|---|
| Scanner | Frontier 350 |
| Film type | 135/IX240 negative or positive film |
| Output media | CD-R, Zip, Jaz |
| Writing format | Exif-JPG 4base, 750frame/CD-R |
| | The estimate capacity was scanned with 3R print size, FSCA use 4R and update capacity. |
| | FlashPix 4base□300frame/CD-R |
| | The estimate capacity was scanned with 3R print size, FSCA use 4R and update capacity. |
| Writing | Writing to blank CDs and CDs which already contains data, is possible. |
| Index print | 40 frames/print |

2.6.2 Reading from DSC Data

The DI Manager 106 converts image to FPX. GLS 100 converts images to JPG and writes to CD-R, Zip, Jaz or FD in accordance with the exemplary parameters of Table 2.

TABLE 2

| | |
|---|---|
| Input file type | Exif-JPG, FPX, CAM |
| Output media | CD-R, Zip, Jaz |
| Writing format | JPG 4base/frame□frame/CD-R |
| | FlashPix 4base/frame□frame/CD-R |
| Viewer | Synchronous writing |
| Writing | Writing to blank CDs and CDs which already contain data, is possible. |
| Index print | 40 frames/print |

File sizes will differ depending on the Horizontal/Vertical (H/V) aspect ratio of the DSC image and image size.

2.6.3 Floppy Disk Writing

Digitizing the film using the printer sub-system 300 (Frontier 350/370), converts the data to FPX. The GLS 100 converts the data to JPG and writes the images to FD in accordance with the exemplary parameters of Table 3.

TABLE 3

| | |
|---|---|
| Scanner | Frontier 350 |
| Film type | 135/IX240 negative or positive film |
| Output media | FD |
| Writing format | JPG 30KB/frame, 30frame/FD |
| Viewer | Synchronous writing |
| Writing | Only writing to a blank FD is possible. |
| Index print | None |

2.7 Image Digitizing and Printing

The following nine print scenarios are described below in detail.

1. CD-R Reprint from CD-R
2. FD Reprint from FD
3. Media print
4. Digital camera print
5. CD-R/Zip/Jazz index print
6. Print from Kiosk 400/600
7. Reprint from Zip
8. Reprint from Jazz Detailed Printing Parameters:

(1) Reprint from CD-R

The GLS 100 prints the images from CD-R in accordance with the exemplary parameters of Table 4. The print size is selectable: L/Hv/P or C/H/P can be selected.

TABLE 4

| | |
|---|---|
| Input media | CD-R |
| File format | FPX, JPG |
| Printer | Frontier 350/370 |
| Print size | All print sizes supported by Frontier 350/370 |

(2) Reprint from FD

The GLS 100 prints the images from FD in accordance with the exemplary parameters of Table 5. Print size is selectable: L/Hv/P or C/H/P can be selected.

TABLE 5

| | |
|---|---|
| Input media | FD |
| File format | JPG |
| Printer | Frontier 350/370 |
| Print size | All print sizes supported by Frontier 350/370 |

(3) Media Print

The GLS 100 prints images processed on user's PC in accordance with th exemplary parameters of Table 6.

TABLE 6

| | |
|---|---|
| Input media | CD-R, FD, PC card, Zip, Smart Media Compact Flash, Jaz, HiFD (refer to 2-1) |
| File format | Exif-JPG, JPG, BMP, FPX, TIFF, GIF, PCD, PICT, COS, DPC, CAM |
| Printer | Frontier 350/370 |
| Print size | All print sizes supported by Frontier 350/370 |

(4) Digital Camera Print

The GLS 100 prints raw (unedited) images from digital cameras in accordance with th exemplary parameters of Table 7.

TABLE 7

| | |
|---|---|
| Input media | CD-R, FD, PC card, Zip, Smart Media Compact Flash, Jaz, HiFD (refer to 2-1) |
| File format | FPX, Exif-JPG, CAM |
| Printer | Frontier 350/370 |
| Print size | DSC size 8.9 × 11.9 cm/10.2 × 13.6 cm and All print sizes supported by Frontier 350/370 |

Note 1: The aspect ratio of the original DSC images differs depending on the manufacturer. The DI Manager 106 adapts to a print size of 3:4 (DSC size) which has been widely adopted.
Note 2: The DI Manager 106 automatically detects the aspect ratio of the original image then finds the best fit print size, or selects the 'all image print'.

(5) CD-R/Zip/Jaz Index Print

The GLS 100 creates an index print from images written to the CD-R, Zip or Jaz in accordance with th exemplary parameters of Table 8.

TABLE 8

| | |
|---|---|
| Input | CD-R/Zip/Jaz |
| Printer | Frontier 350/370 |
| Print size | 4 × 4.7 in. (10.2 × 12 cm) CD-R jacket size |

(6) Print from Kiosk

The GLS 100 prints files which have been ordered using the printer sub-system 300 in accordance with th exemplary parameters of Table 9.

TABLE 9

| | |
|---|---|
| Input | Network or via media |
| File format | COS, .ORD |
| Printer | Frontier 350/370 |
| Print size | All print sizes supported by Frontier 350/370 |

(7) Reprint from Zip

The GLS 100 prints the images from CD-R in accordance with th exemplary parameters of Table 10. The print size is selectable: L/Hv/P or C/H/P.

TABLE 10

| | |
|---|---|
| Input media | Zip |
| File format | Exif-JPG, JPG, BMP, FPX, TIFF, GIF, PCD, PICT, COS, DPC, CAM |
| Printer | Frontier 350/370 |
| Print size | All print sizes supported by Frontier 350/370 |

(8) Reprint from Jaz

The GLS 100 prints the images from CD-R in accordance with th exemplary parameters of Table 11. The print size is selectable: L/Hv/P or C/H/P.

TABLE 11

| | |
|---|---|
| Input media | Jaz |
| File format | Exif-JPG, JPG, BMP, FPX, TIFF, GIF, PCD, PICT, COS, DPC, CAM |
| Printer | Frontier 350/370 |
| Print size | All print sizes supported by Frontier 350/370 |

3 GLS 100 Interface Specifications

3.1 Order Purchase File

The inbound and outbound order purchase file requirements for GLS 100 are defined by a GLS Order File (identified as .ORD). The Image Center 700 and the Kiosk 400/600 generate a GLS Order File and send it (via FTP) with the associated images, to the Global Lab Software (GLS) 100 for processing. These files are received into a specific directory and are identified by order number. Software will poll for these .ORD files and process them. The GLS Order File, which is a text format file, contains order parameters for the different types of services requested, such as print, reprint, T-shirt purchases, etc.

3.1.1 Digital Lab System Inbound & Outbound Requirements

GLS 100 also supports existing order purchase specifications for existing lab systems. Hence, GLS 100 will be responsible for processing the existing .ord, order file format. The GLS Order File for the Image Center 700 and Kiosk 400/600 support has similar but expanded order parameters (described in more detail in Section 7). When processing an inbound or an outbound order file, the GLS 100 first checks parameters in the order file to distinguish one of these formats before processing:

Existing Case

The Image Center 700 FTPs an order file to GLS 100 using an existing order file format.

GLS Order File Case

The Image Center 700 FTPs an order file to the GLS 100 using the new order file format. In this process, the Image Center 700 remotely creates a directory on the GLH 200. The name of the directory is the order id. (i.e. FSC121212121). Once the directory is created, individual images are copied into it, then the related .ord file is also copied into the directory.

New Kiosk Case (For Local 400 and Remote 600 Kiosks)

A remote Kiosk 600 sends an order file via FTP to GLS 100 using the Kiosk order file format. A local Kiosk 400 has a shared drive where Lab Software resides, the GLS Order file on the Kiosk 400 can be accessed. In both the remote and local Kiosk scenarios, the Kiosk 400/600 will be responsible for creating a directory on the Lab Software machine. Its directory name is the order id name. (i.e. FSC12121212). Once the directory is created, individual images are copied into it, then the related .ord file is also copied into this directory.

An example of an Order File is shown as follows:
[JOB]
SenderID=
RollID=album
OrderID=97
Tracknum=PICPIT0009798
StoreName=<unknown>
StoreID=0
LabID=SFS
LabFTPAddress=207.135.84.33
LabFTPUsername=anonymous
LabFTPPassword=foobar
LotNo=0001
Origin=0
NoOfScanImage=4
Source=4
Date=08/12/1998 14:42:26.000
[Print]
ImageFile=3.fpx,4.fpx,1.fpx,2.fpx
ProductCode=802,808,802,816
ProductAttrs=,Size:L,,Size:XL
ImageSize=4×6,5×7,4×6,4×6
Border=0,0,0,0
NoOfPrint=3,2,1,1
FilmType=URL,URL,URL,URL
Orientation=0,0,0,0
BackPrint=card1f1.fpx,pcdgirl.jpg,ct0645.mix, ct0823.mix
[text]
OrderID: 97
Tracking Number: PICPIT0009798
Roll ID:
Store ID: 0
Store Name: <unknown>,<unknown>,<unknown>
Member ID: 3HS8ETVBP9
Date: 08/12/1998 14:42:26.000

ORDER DETAILS:

| Item | Roll | Frame | Quant. | Price | Total |
|---|---|---|---|---|---|
| Adult's Photo T-Shirt (Extra large) | album | 2.fpx | 1 | $19.99 | $19.99 |
| Photo Reprints (4 × 6 inch reprints f | album | 3.fpx | 3 | $0.99 | $2.97 |
| Photo Reprints (4 × 6 inch reprints f | album | 1.fpx | 1 | $0.99 | $0.99 |
| Photo Reprints (5 × 7 inch enlargemen | album | 4.fpx | 2 | $4.99 | $9.98 |
| Item Sub-Total: | | | | | $0.00 |
| Shipping & Handling: | | | | | $0.00 |
| Tax: | | | | | $0.00 |
| Total: | | | | | $0.00 |

Figure 11:
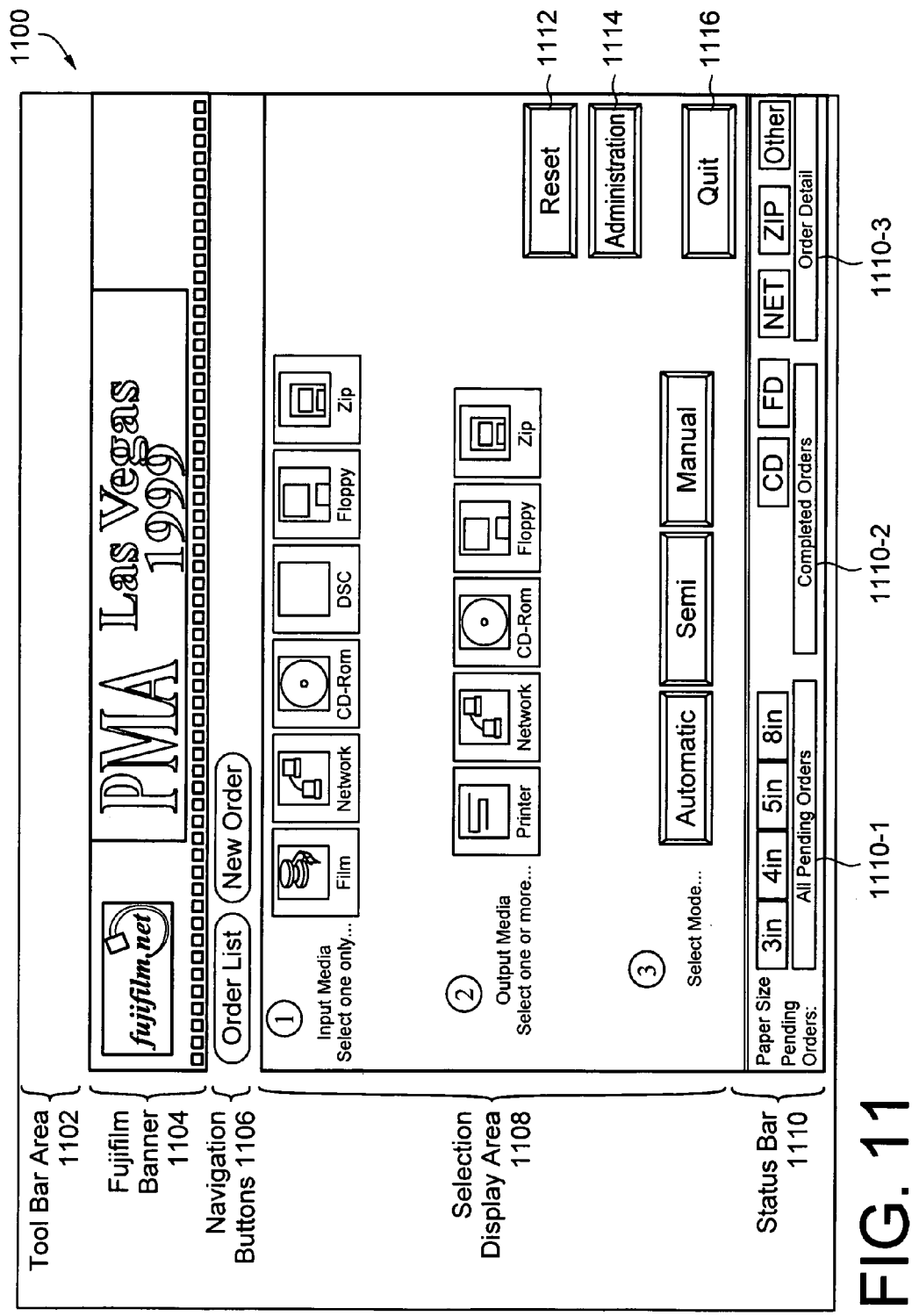
FIG. 11 illustrates a new order screen in an exemplary embodiment of the present invention.

MAIL TO:
SHIP VIA:
CyberCash Authorization Code:
Customer Transaction ID: 980626221700153
Customer Transaction Number:

5 Operator Interface 5.1 Global Lab Software (GLS 100)—Operator Selection Screens When the operator runs GLS 100 on the imaging workstation, the New Order screen 1100, illustrated in FIG. 11, is displayed first. The areas and layout of the New Order screen 1110 are described below.

Generally, the operator screens of the present invention are divided into several general areas. At the very top of the screen is a Toolbar Area 1102 and usually has File and Help selection tools. Just below that is the Banner 1104 and below that are the Navigation buttons 1106. The lighter oval (highlighted) Navigation button 1106 indicates the title of the page displayed in the area below: the Selection Display Area 1108. Areas displayed on multiple screens include: the Tool Bar Area 1102, the Banner 1104, the Navigation buttons 1106 and a Status Bar 1110. The Selection Display area 1108 changes depending on the tab selected.

In the Selection Display Area 1108, GLS 100 displays a page of operator information for operator to make various selections. In the example in FIG. 11, the New Order screen 1100 is displayed and the operator selects from: area (1108-1) the input media for the new order (one type); area (1108-2) the output media for the order (one or more types); and area (1108-3) the type of processing desired: Automatic, Semi-automatic, or Manual processing.

At the bottom of the screen the Status Bar 1110 shows all pending orders as buttons. The individual paper widths are highlighted if any of the pending jobs require that magazine. The individual output media types are highlighted if any of the pending jobs use that type. At the very bottom are the three selection buttons: All Pending Orders 1110-1, Completed Orders 1110-2 and Order Detail 1110-3. All Pending Orders 1110-1 brings up another window showing all orders currently pending. Completed Orders 1110-2 brings up another window showing all orders which have been completed. Order Detail 1110-3 shows specific information on a job which the user specifies.

Since, in a preferred embodiment, data entry is performed using a touch screen or mouse, all the input buttons and icons areas are big enough to allow operator selection with different size fingers. For Input Media Select 1108-1 the operator selects only one type of media by touching the desired media icon and that media is highlighted. For Output Media Select 1108-2, the operator can select one or more types of output media and they are each highlighted.

To advance to the next selection screen, the operator selects a mode button 1108-3: Automatic, Semi-Automatic or Manual processing. Pressing the Automatic button causes a pop-up screen to be displayed for selecting the quantity and print size for the order.

There are three buttons on the right side of the Selection Display area 1106 titled Reset 1112, Administration 1114, and Quit 1116. The Reset button 1112 will clear the order selection; the Administration button 1114 goes to the Administration Setup screens (discussed below in conjunction with FIGS. 2 18–24); and the Quit button 1116, goes to the Order List screen 1200 (discussed below).

5.2 Order List

Figure 12:
FIG. 12 illustrates an order list screen in one exemplary embodiment of the present invention.

The Order List page 1200, illustrated in FIG. 12, is another main starting point for an order. The Order List page 1200 can be displayed by pressing the Order List button in the Navigation Bar 1106 and shows all customer orders (for example "namel" in FIG. 12) listed vertically and the number and size of the output prints desired. Selecting one of these orders displays the details of this customer order.

The Order List page 1200 is displayed by depressing the Order List navigation button in the Navigation Bar 1106.

A user may select and delete an order 1202, process the order 1204 or cancel the order 1206 selected using the buttons on the lower right. Pressing New Order navigation returns to the New Order screen 1100.

5.3 Automatic Processing

From the New Order screen 1100, selecting one of the Mode buttons 1108-3; Automatic, Semi-automatic or manual advances to the next set of screens.

Figure 13:
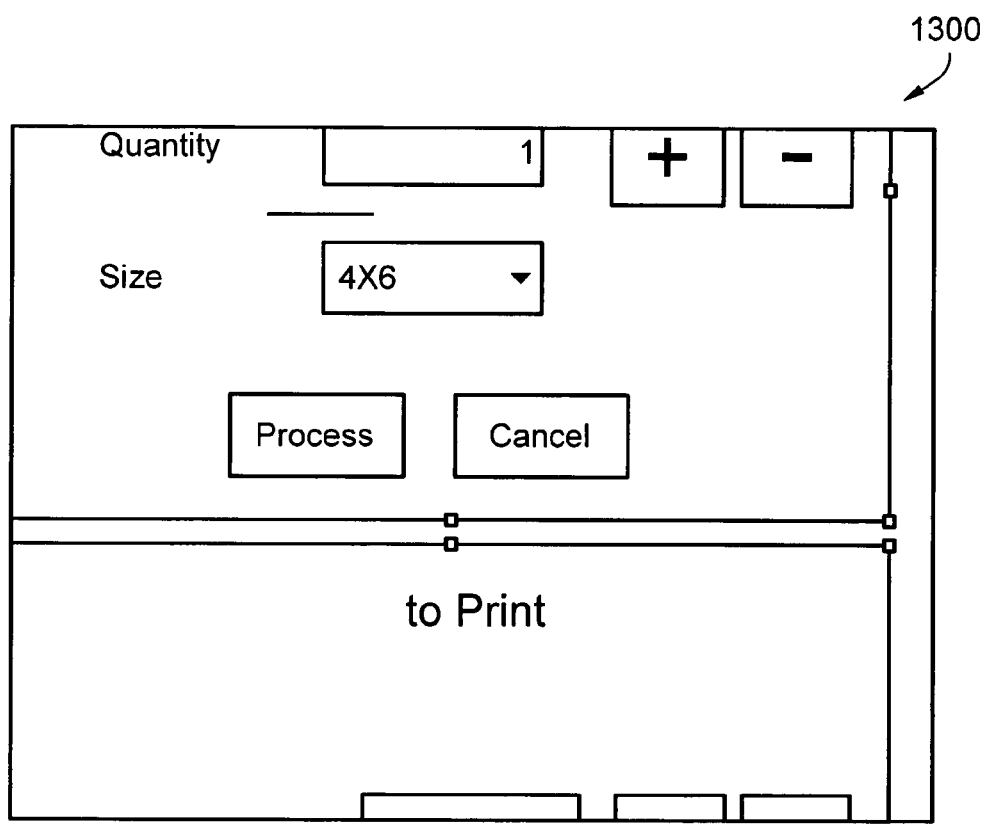
FIG. 13 illustrates a pop-up selection box in one exemplary embodiment of the present invention.

If Automatic is selected, a pop-up selection box 1300 appears (illustrated in FIG. 13), to allow the operator to change the quantity and size of the prints. The title of this box is dependent on the output media and may be: Floppy Disk to Print, Zip to Print, CD-ROM to Print, Network to Print, or DSC to Print.

Figure 17:
FIG. 17 illustrates a customer information page in one exemplary embodiment of the present invention.

Pressing the Process button causes the order to process and display the Customer Information Page (discussed below in conjunction with FIG. 17).

5.4 Image Display Page

Figure 14:
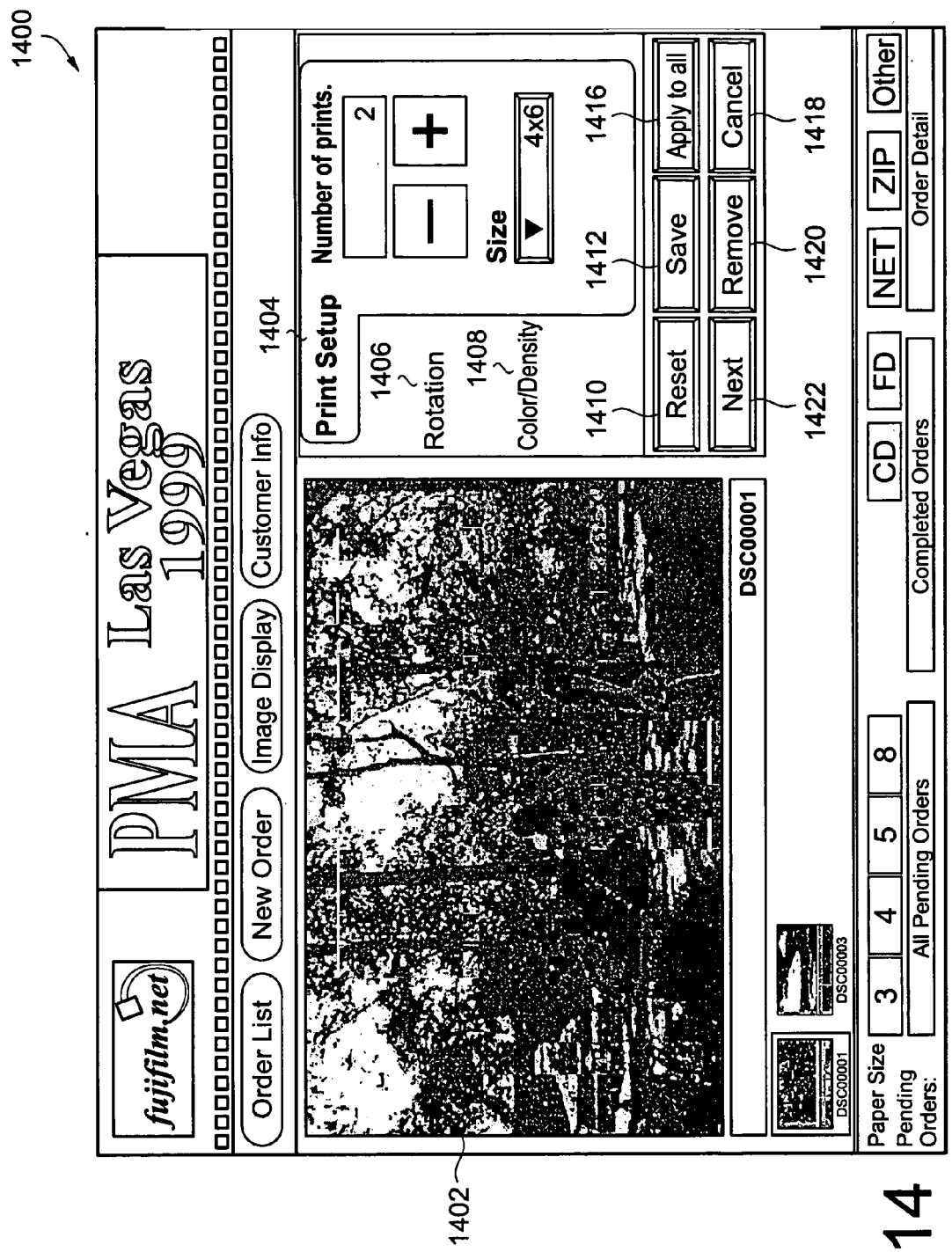
FIG. 14 illustrates an image display screen in one exemplary embodiment of the present invention.

From the New Order screen 1100, if the Semi-automatic or the Manual button is pressed, the Image Display page 1400 illustrated in FIG. 14 is shown. The Image Display page 1400 allows operator selection of a specific image DSC00001 and DSC 00003 (in FIG. 14) from icons displayed near the bottom of the page. For each image, the operator may make changes to the Print Setup for the number of prints, size of print, rotation of the image on the print, and minor adjustments to color and density. It is noted that the image shown in the following screens is not representative of the image quality of an actual image.

After selecting the image from the icons displayed near the bottom of the page, the image is displayed in the preview area 1402 (in one embodiment, 300 by 300 pixels). Just to the right of the preview area 1402 are three selection tabs: Print Setup 1404, Rotation 1406, and Color/Density 1408. Selecting the Print Setup tab 1404 as shown in FIG. 14, allows the operator to set the number of prints and size of the prints for the image in the preview area 1402.

Figure 15:
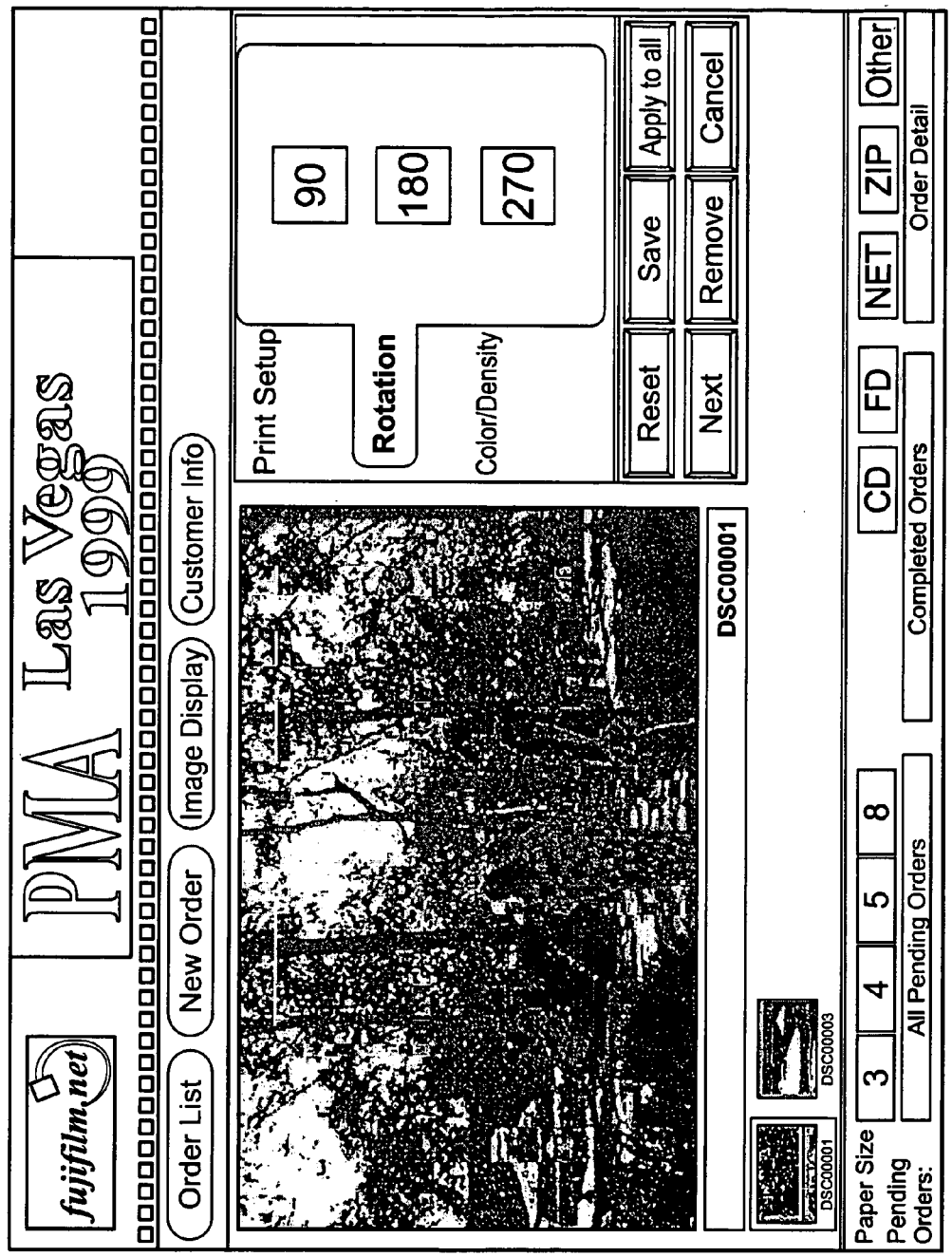
FIG. 15 illustrates a rotation feature in one exemplary embodiment of the present invention.

Selecting the Rotation tab 1406 allows the operator to adjust the rotation of the image printed to 90 degrees clockwise, 180 degrees clockwise, 270 degrees clockwise, etc. as illustrated in FIG. 15.

Figure 16:
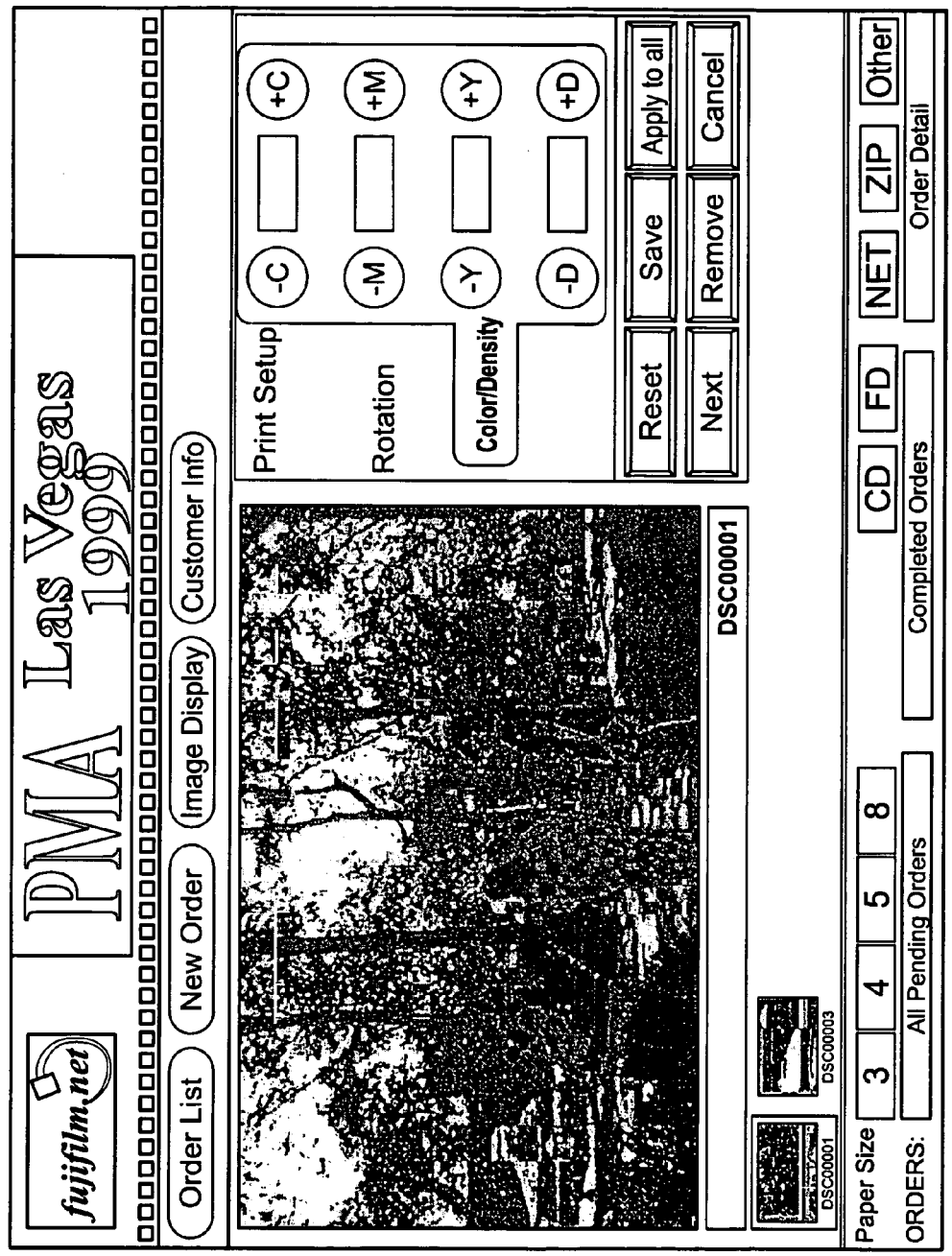
FIG. 16 illustrates adjustment of a color/density feature in one exemplary embodiment of the present invention.

Pressing the Next button advances to the Customer Information page (discussed below in conjunction with FIG. 17) or pressing the Color/Density tab 1408 shows the color and Density adjustments panel, illustrated in FIG. 16.

Selecting the Color/Density tab 1408 on the right side of the Image Display page 1400 displays to the operator Color/Density adjustment buttons −C, +C, −M, +M, −Y, +Y, −D, +D.

The Color/Density adjustment buttons allow the operator to change the cyan (c), magenta(m), and yellow (y) channel levels by using the minus (−) buttons or plus (+) buttons in any combination. The changes may be shown (in one exemplary embodiment) in increments of 5 units and range from −25 to +25. Touching the +C button permits adjusting the cyan channel for more cyan. Touching the +M permits adjusting the magenta channel for more magenta. Touching the +Y permits adjusting the yellow channel for more yellow. Conversely, touching the minus (−) button of any of these results in the reduction of the associated color channel. The resulting image is displayed in the image preview area 1402.

The density of the printed image may also be adjusted using the −D and +D buttons, in increments (in one exemplary embodiment) of 15 units, and range from −75 to +75 units. Plus (+) darkens the image and minus (−) lightens the image. The resulting image is displayed in the image preview area 1402.

In FIGS. 14–16, the buttons just below Print Setup 1404, Rotation 1406, and Color/Density 1408 are used as follows: the Reset button 1410 is used to clear the image adjustments for the image in the Preview Area 1402 and start over. The Save button 1412 is used to keep the settings with the image for future reference. The Apply to All button 1416 applies the settings to all images. The Cancel button 1418 cancels the order and returns to the New Order page 1100. The Remove button 1420 removes the image from the print process. Finally, the Next button 1422 is used to advance to the Customer Information page, described below in conjunction with FIG. 17.

5.5 Customer Information Page

Selecting the Next button 1422 from the Image Display page 1400, advances to the Customer Information page 1700. This page 1700 is used to record the customer's name, address, city, state and Zip code.

Pressing the Process button causes the progress indicator bar to be displayed in a pop-up box and when the progress bar achieves 100%, the New Order page 1100 is again displayed.

5.6 Manual Selection

On the New Order page 1100, pressing the Manual Mode button allows the operator to manually select the directory and individual images on any file or directory, using the standard Windows open dialog box. The operator must search and select the images to be used manually. Once a directory and file or group of files is selected, the Image Display page 1400 is again displayed. Navigation and selection continues as described above.

6 Administration Interface

6.1 Global Lab Software (GLS 100)—Administration Setup Screens

Pressing the New Order button of the Navigation Buttons 1106 illustrated in FIG. 11 produces the first of a set of administration screens 1800 (illustrated in FIGS. 18–24) which are used to define the input devices 1802, output devices 1804, supervisor options 1806 and to identify the type of user 1808. All of these screens are selected by clicking on the Navigation Buttons 1106.

The selection and operation of the administration screens 1800 are somewhat different from the previously described operator screens. As illustrated in the example in FIG. 18 in the left window is an Available List 1810, in the right window, a Selected List 1812. The user selects one of the items from the Available List 1810, and presses the Add button between the windows to move the selected item to the Selected List 1812. The user may also double-click on the item in the Available List 1810 to move it to the Selected List 1812. If the user makes an error, the user can select the item in the Selected List 1812 and press the Remove button (or double click on the item) to return it to the Available List 1810.

The user may also select all items from the Available List 1810 and move them to the Selected List 1812 by pressing the Add All button. Pressing the Clear button causes all selected items to be returned to the Available List 1810. If the Selected List 1812 is very long, there are two buttons under the window, an up and a down button to scroll the list. When the user is satisfied with the Selected List 1812, pressing the Set Options button causes the list to be saved.

Figure 19:
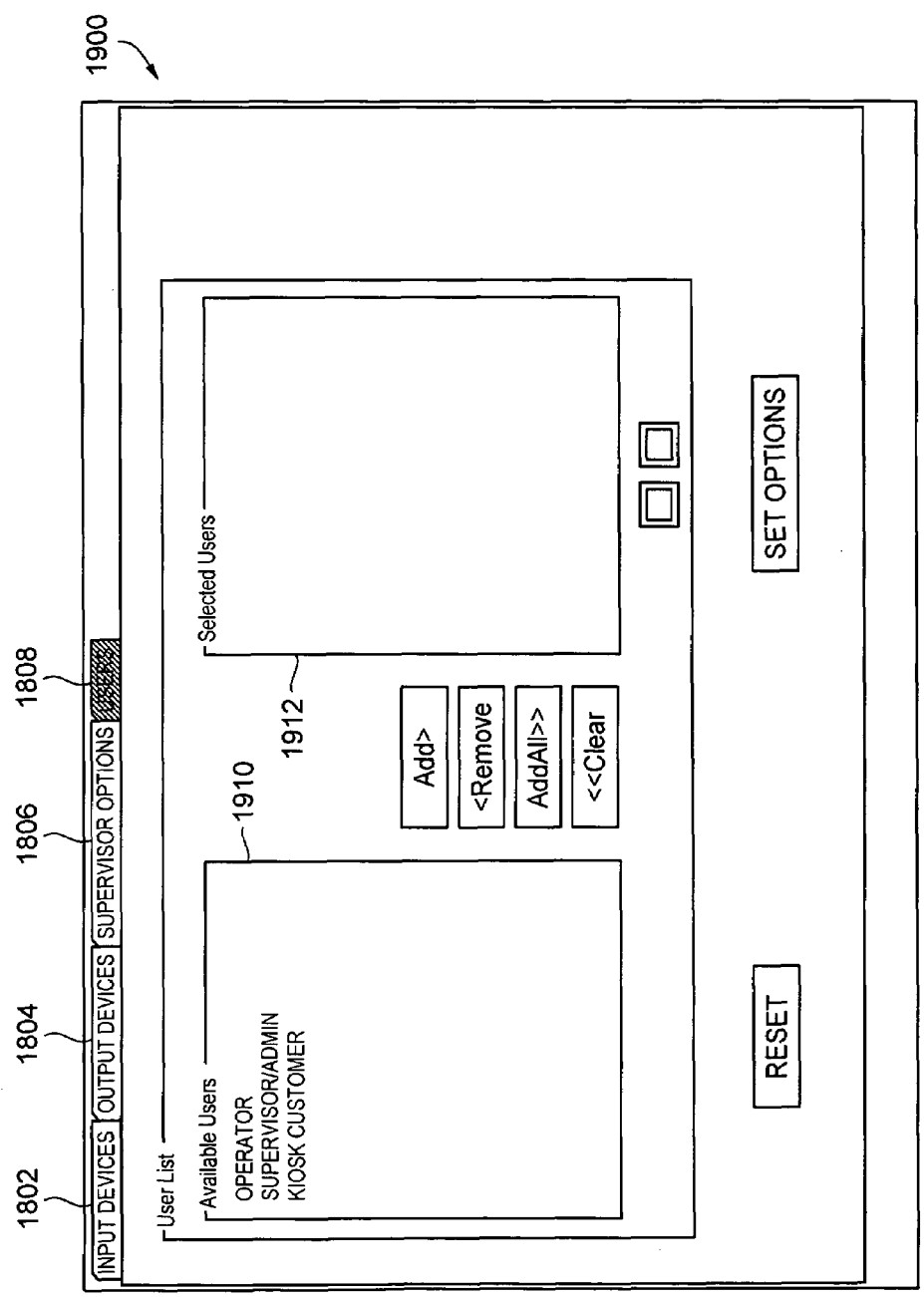

If the user activates the button 1808, the exemplary Users Folder 1900, illustrated in FIG. 19, is then displayed.

Selecting Operator in the Available Users List 1910, allows the administrator to add more users and selecting Kiosk Customer allows the administrator to add more Kiosk customers. One can also select the Supervisor/Admin. by moving it to the Selected Users List 1912 by pressing the Add button (or double clicking on the Supervisor/Admin). Pressing the Set Options button saves the selection, and permits navigation as the Supervisor/Administrator user.

Figure 18:
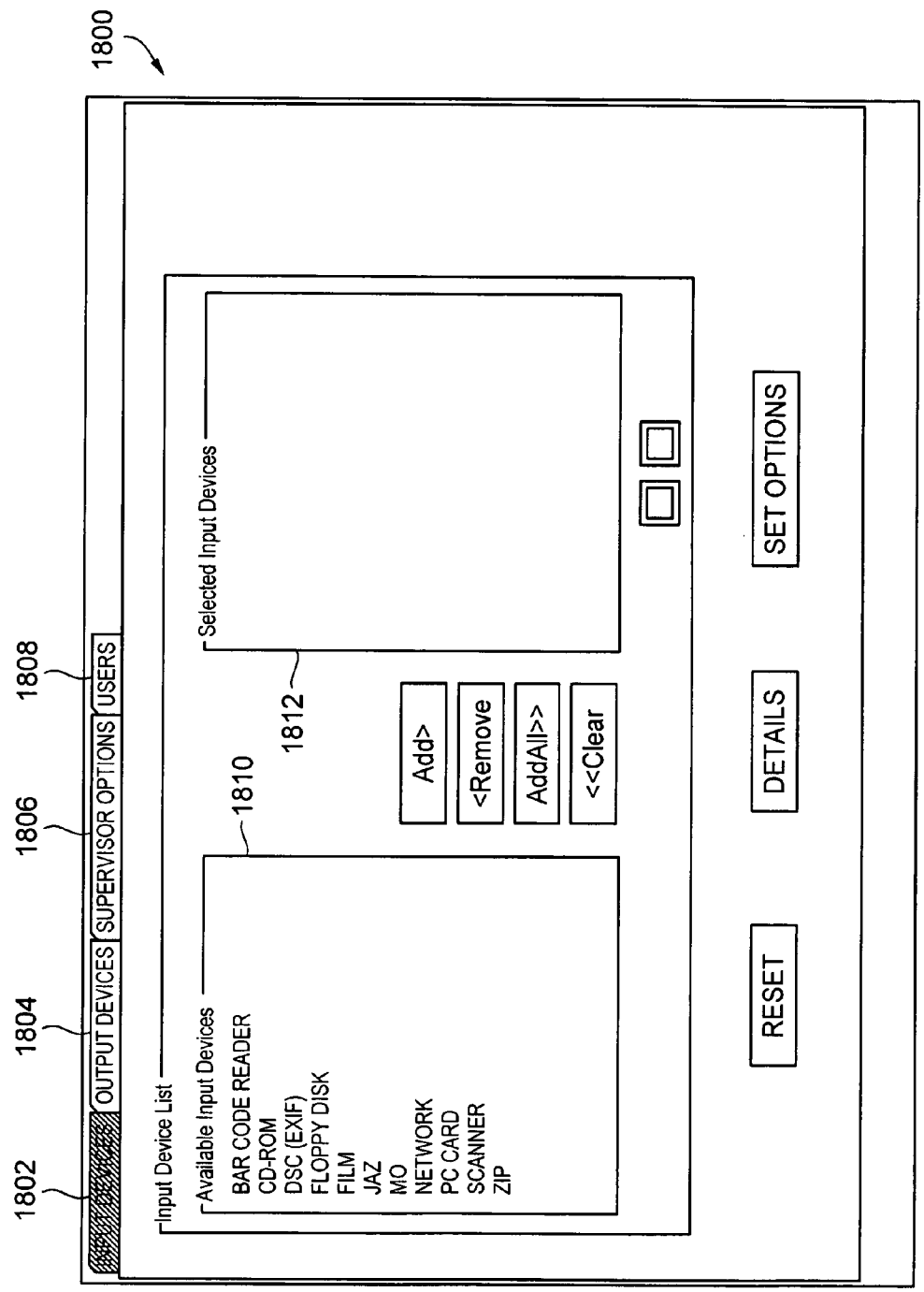
FIGS. 18–24 illustrate a set of administrative screens in one exemplary embodiment of the present invention.
Figure 20:
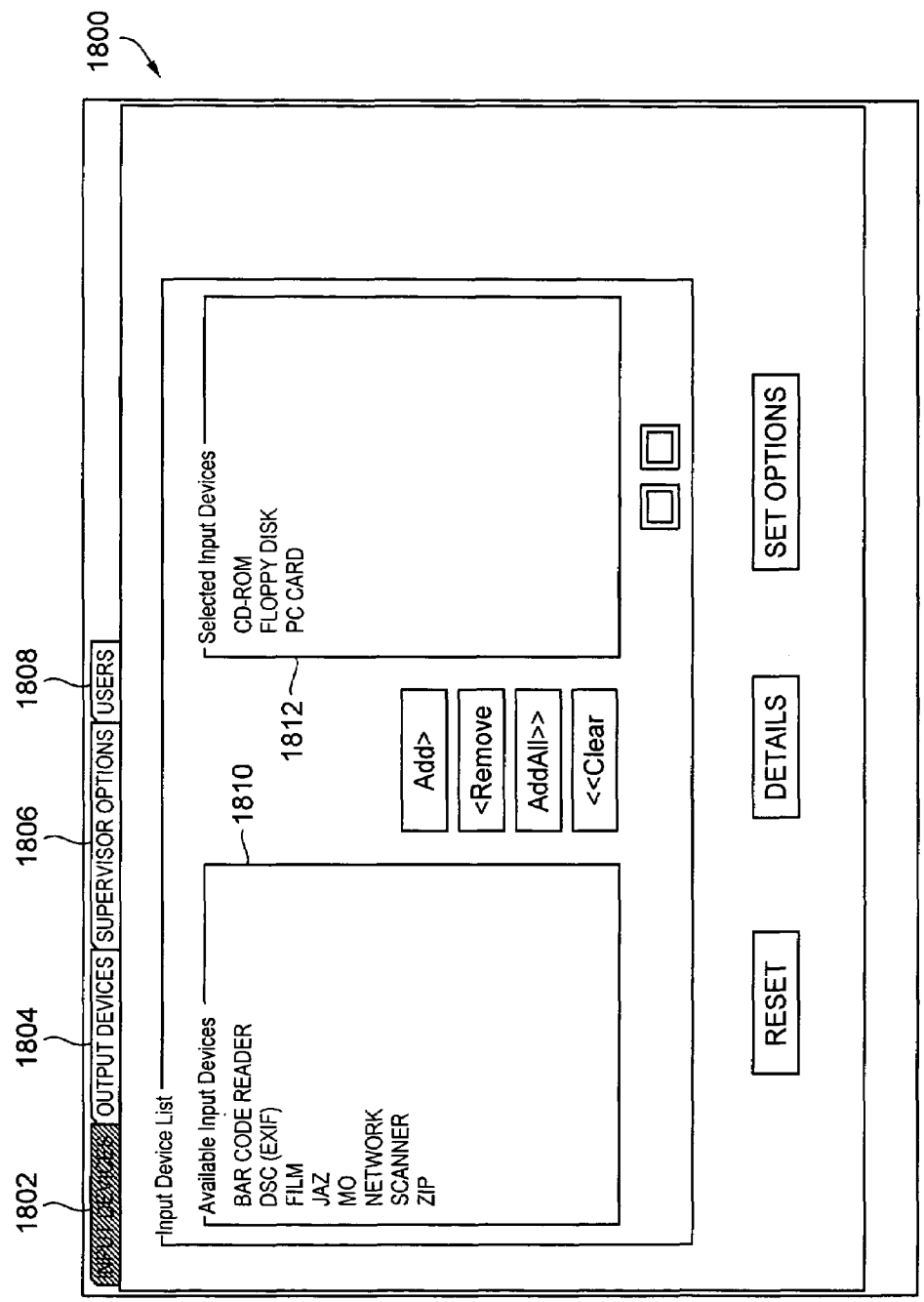

FIG. 20 illustrates the use of the administration screen 1800 of FIG. 18 in more detail; in particular, the Selected List 1812. FIG. 20 illustrates that the CD-ROM, Floppy Disk, and PC Card have each been selected one at a time and by pressing the Add button for each input device have been added to the Selected Input List 1812. Pressing Set Options saves this list.

Figure 21:
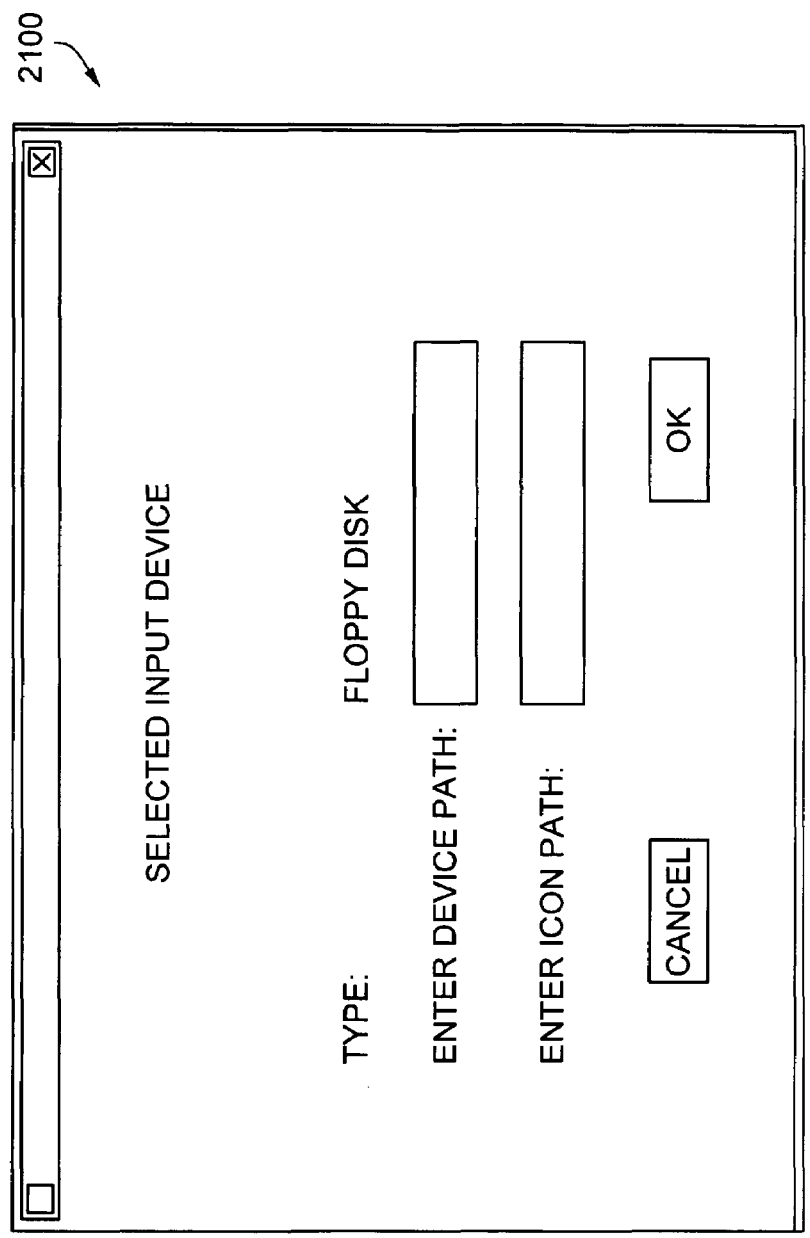
Figure 22:
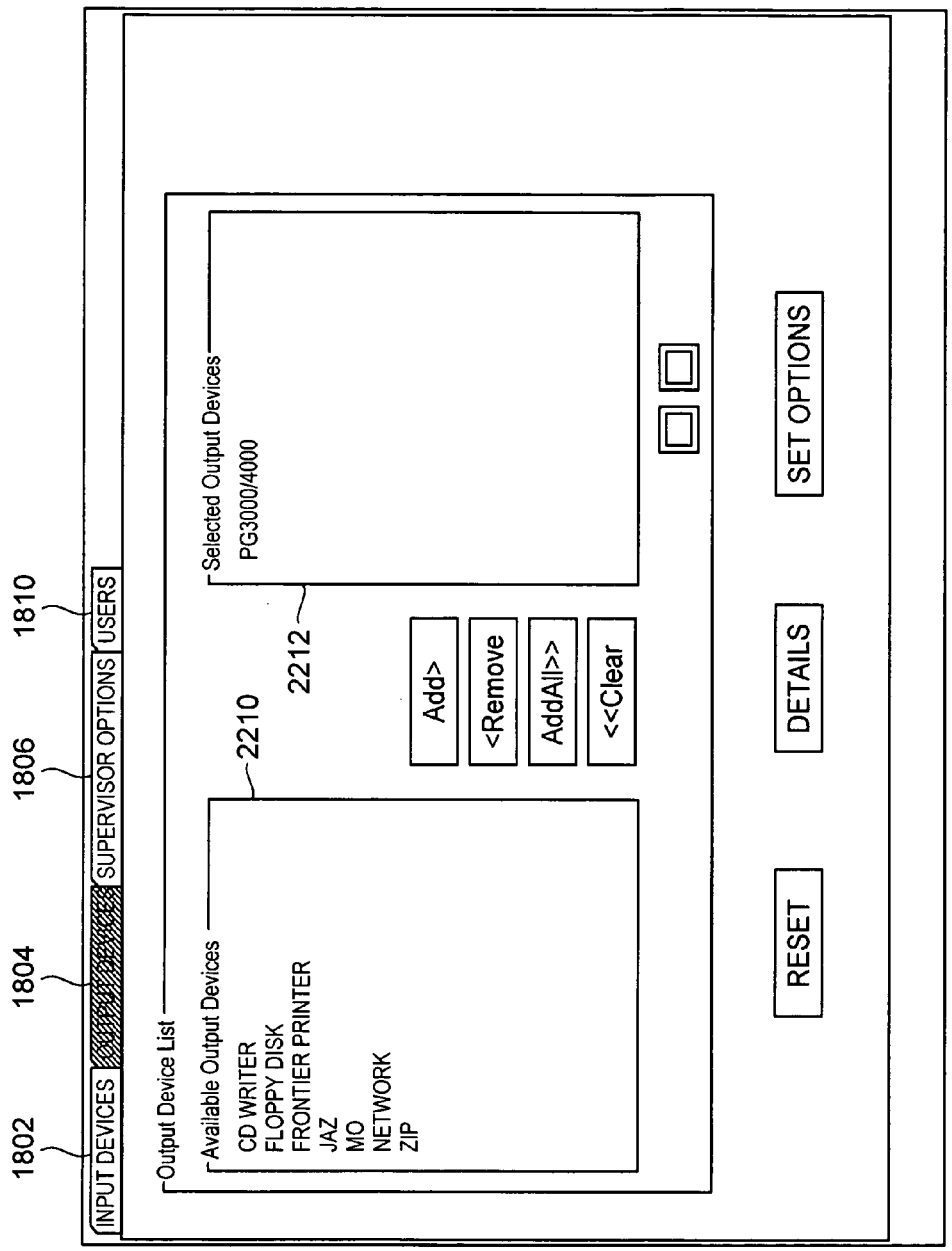
Figure 23:
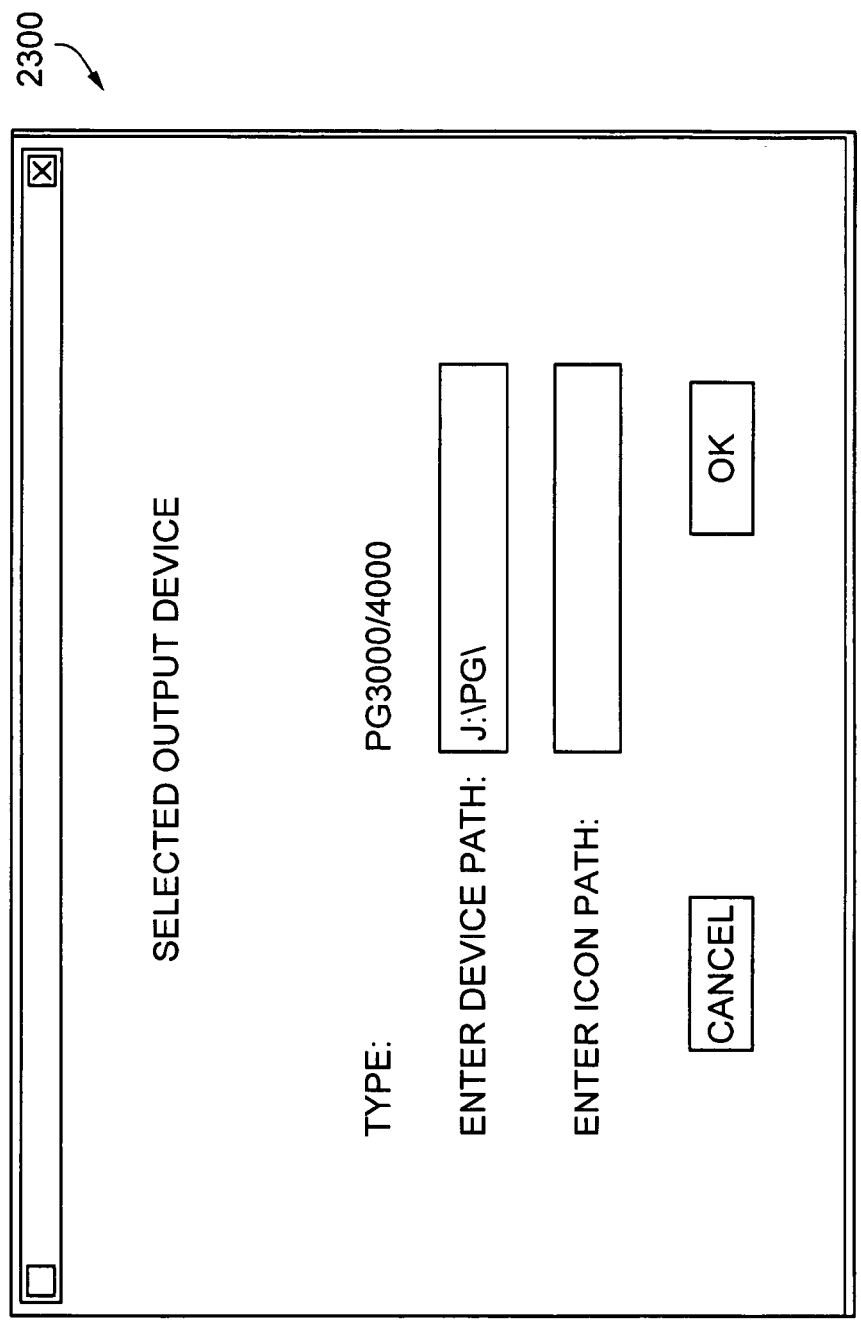

For each of the input devices, selecting the device from the Selected Input List 1812 and pressures the Details button produces the drop-down box 2100 illustrated in FIG. 21. The drop down-box 2100 may be used to enter the input device path (such as a:), and an icon path). Pressing OK accepts the entered path; cancel takes the user back to the previous Input Device Folder of FIG. 20.

In FIG. 18, if Output Devices 1804 is selected, a folder similar to FIG. 18 (illustrated in FIG. 22) is displayed. Highlight the PG3000/4000 printer and pressing the Add buttons move it from the Available Output Device List 2210 to the Selected List 2212. Highlighting the PG3000/4000 line again and pressing the Details button produces the Output Details drop-down box 2300 illustrated in FIG. 23.

The drop down-box 2300 may be used to enter the output device path (such as J\P(G)), and an icon path. Pressing OK accepts the entered path; cancel takes the user back to the previous Input Device Folder of FIG. 20.

Figure 24:
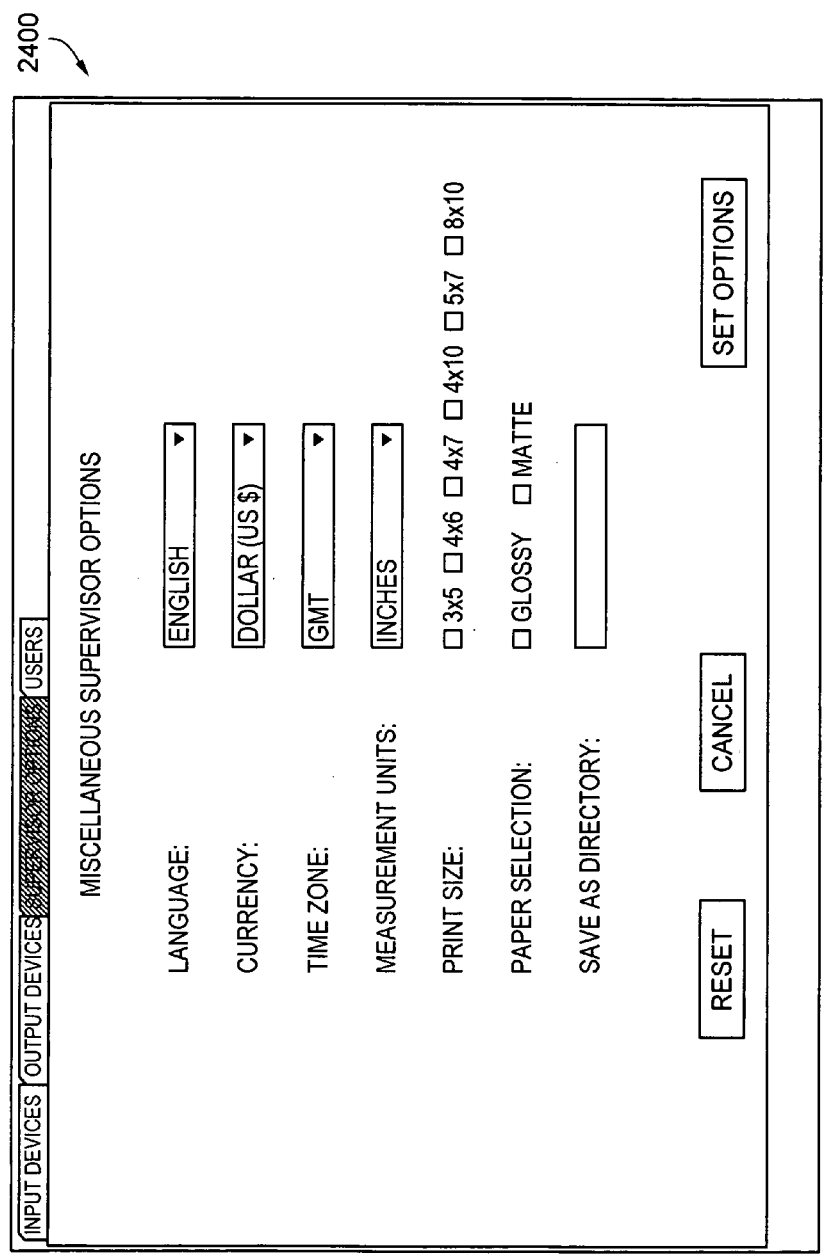

In FIG. 18, if Supervisors Options 1806 is selected, Supervisor Options folder 2400, illustrated in FIG. 24, is displayed. From Folder 2400, a user may set the local language, the monetary units, the operating time zone, units of measurement, print sizes available, paper type (Glossy and/or Matte) and identify a specific Save As directory as the default output directory path.

In the language box, clicking on the down triangle opens a drop-down box and permits selection of the appropriate language for the displayed screens: English, French, German, Spanish, Japanese. etc.

In the Currency box, clicking on the down triangle opens the drop-down box and permits selection of the appropriate currency from the selections available.

In the Time Zone box, clicking on the down triangle opens the drop-down box and permits selection of a time zone, such as Greenwich Mean Time (GMT), Eastern Standard Time (EST), Pacific Standard Time (PST), etc.

For Print Sizes, a user may check all print sizes available to be printed on the printer sub-system 300.

For Paper Selection, a user may check each box: Glossy and/or Matte as appropriate.

In the Save as Directory box, a user may enter specific Save As directory default as the output disk drive and directory.

When the user has completed all selections, the user may press the Set Options button to save the selections and close the Supervisor Options file.

FIGS. 18–24 describe the Administration Setup Screens in detail. Pressing Cancel to return to FIG. 11.

7 GLS 100 Purchase Order File

The following described a GLS 100 purchase order file in more detail.

7.1 GLS Purchase Order File Specifications

The Image Center 700 and the Kiosk sub-system 400/600 generate a GLS Purchase Order File and send it (via FTP) with the associated images, to the Global Lab Software (GLS) 100 for processing.

7.1.1 Existing Order File Parameters Description

The Existing Order File parameters are defined as follows:

[Job] : This tab indicates this is an existing order file format used by the system 10.

SenderID: The Sender id (string 128 char)

RollID : Roll id (string, 128 char)

OrderID : Order Id, this should be an unique number (string, alphanumeric 128 char)

Tracknum : This contains a variable number of alphabet characters followed by the order number. (string, 128 char)

StoreName: The name of the store that first receives the input (string 128 char)

StoreID : The id of the store

LabID : The id for the processing lab using lab software (string 128 char)

LabFTPAddress: ftp address where the order file and images are to be sent (alphanumeric 24 char)

LabFTPUsername: FTP login user name (alphanumeric 7min, 12 max)

LabFTPPassword: FTP password name (alphanumeric 7min, 12 max)

LotNo: Lot number (string 128 char)

Origin: Origin (string 128 char)
NoOfScanImage: Number of Scanned images (int 999 max)
Source: Source (string 128 char)
Date: Send date (string 128 char)
[Print]: This describes the print information.
ImageFile: Contains one or more image file names
ProductCode: The product code (string 128 char)
ProductAttrs: The attributes of the product such as: size, colors and etc. . . . (string 128 char).
ImageSize: The output image sizes for the respective image files
Border: The border info for respective images
NoOfPrint: The number of prints for the respective images (int 999max)
FilmType: File Type of the respective images (string 128 char)
Orientation: Orientation of the respective images
BackPrint : Back print for the respective images (two lines 40 char max)
[text]: This section contains text to be printed on the invoice.

GLS Order File (Image Center 700 Case) Parameters Description
A sample of the GLS Order File for the Image Center 700 is as follows:
[IMAGE CENTER 700 JOB]
SenderID=
RollID=album
OrderID=97
Tracknum=PICPIT0009798
StoreName=<unknown>
StoreID=0
LabID=SFS
LabFTPAddress=207.135.84.33
LabFTPUsemame=anonymous
LabFTPPassword=foobar
NoOfScanImage=4
Source=4
Date=08/12/1998 14:42:26.000
[Print]
ImageFile=3.fpx,4.fpx,1.fpx,2.fpx
ProductCode=802,808,802,816
ProductName=T-shirt, T-shirt, T-shirt, T-shirt,
ProductAttrs=,Size:L,,Size:XL
ImageSize=4×6,5×7,4×6,4×6
Border=0,0,0,0
NoOfPrint=3,2,1,1
Orientation=0,0,0,0
BackPrint=card1f1.fpx,pcdgirl.jpg,ct0645.mix, ct0823.mix
[Invoice]
OrderID: 97
Tracking Number: PICPIT0009798
Roll ID:
Store ID: 0
Store Name: <unknown>,<unknown>,<unknown>
Member ID: 3HS8ETVBP9
Date: 08/12/1998 14:42:26.000
Item: Adult's Photo T-Shirt (Extra large), Photo Reprints (4×6 inch reprints f,
Photo Reprints (4×6 inch reprints f
Roll: album, album, album, album
Frame: 2.fpx, 3.fpx, 1.fpx, 4.fpx
Quantity: 1,3,1,2
Price: $19.99, $0.99, $0.99, $4.99
Total: $19.99, $2.97, $0.99, $9.98
Item Sub-Total: $0.00
Shipping & Handling: $0.00
Tax: $0.00
Total Amount: $120.00
CyberCash Authorization Code:
Customer Transaction ID: 980626221700153
Customer Transaction Number:
[text]
OrderID: 97
Tracking Number: PICPIT0009798
Roll ID:
Store ID : 0
Store Name: <unknown>,<unknown>,<unknown>
Member ID: 3HS8ETVBP9
Date: 08/12/1998 14:42:26.000
ORDER DETAILS:

| Item | Roll | Frame | Quant. | Price | Total |
|---|---|---|---|---|---|
| Adult's Photo T-Shirt (Extra large) | album | 2.fpx | 1 | $19.99 | $19.99 |
| Photo Reprints (4 × 6 inch reprints f | album | 3.fpx | 3 | $0.99 | $2.97 |
| Photo Reprints (4 × 6 inch reprints f | album | 1.fpx | 1 | $0.99 | $0.99 |
| Photo Reprints (5 × 7 inch enlargemen | album | 4.fpx | 2 | $4.99 | $9.98 |
| Item Sub-Total: | | | | | $0.00 |
| Shipping & Handling: | | | | | $0.00 |
| Tax: | | | | | $0.00 |
| Total: | | | | | $0.00 |

MAIL TO:
SHIP VIA:
CyberCash Authorization Code:
Customer Transaction ID: 980626221700153
Customer Transaction Number:
The GLS Order File (for the Image Center 700) parameters are very similar to that of the existing order file with the following distinctions:
[IMAGE CENTER JOB]
This first tag indicates that this order file is sent using the new GLS Order File format.
The [invoice] section is added to the existing parameters to captures invoice information. These parameters are extracted from the unformatted [text] section so the GLS 100 can easily process them.

GLS Order File (Kiosk Case) Parameters Description
A sample of the GLS Order File for the Kiosk sub-system 400/600 is as follows:
[KIOSK]
SenderID=
RollID=album
OrderID=97
Tracknum=PICPIT0009798
StoreName=<unknown>
StoreID=0
LabID=SFS
LabFTPAddress=207.135.84.33
LabFTPUsemame=anonymous
LabFTPPassword=foobar
NoOfScanImage=4
Date=08/12/1998 14:42:26.000
[INPUT]
InputType=CD ROM

```
[FLOPPY DISK READ]
ImageFile=1.FPX,2,FPX,2,FPX,2,FPX
InputDirPath=d:\image\,d:\image
Orientation=0,0,0,0
[CD-ROM]
ImageFile=1.FPX,2,FPX,2,FPX,2,FPX
InputDirPath=d:\image\,d:\image
Orientation=0,0,0,0
[ZIP READ]
ImageFile=1.FPX,2,FPX,2,FPX,2,FPX
ImageType-4xbase,1xBase,1xBase,1xBase
InputDirPath=e:\image,e:\image,e:\image,e:\image
Orientation=0,0,0,0
[FLATBED SCANNER]
DeviceName=
ImageFile=1.FPX,2,FPX
ImageType-4xbase,1xBase
Orientation=0,0
[DSC READ]
DeviceName=
ImageFile=1.FPX,2,FPX
ImageType-4xbase,1xBase
Orientation=0,0
[OUTPUT]
Output=PRINT, CD WRITE, MO WRITE, JAZZ WRITE, ZIP WRITE, FLOPPY DISK WRITE
[PRINT]
Print=Yes
ImageFile=3.fpx,4.fpx,1.fpx,2.fpx
ProductCode=802,808,802,816
ProductName=T-shirt,T-shirt,T-shirt,T-shirt
ProductAttrs=,Size:L,,Size:XL
ImageSize=4×6,5×7,4×6,4×6
Border=0,0,0,0
NoOfPrint=3,2,1,1
FilmType=URL,URL,URL,URL
Orientation=0,0,0,0
BackPrint=card1f1.fpx,pcdgirl.jpg,ct0645.mix,
   ct0823.mix
[CD WRITE]
NewSession=yer
InputImageFile=3.fx,4.fpx,1fpx,2.fpx
ServiceCode=602,602,602,602
ServiceName=CD Writing, CD Writing, CD Writing, CD Writing
OutputImageFile-3.jpg,2.jpg,1.jpg,2.jpg
OutputDirectory=E:\image, E:\image, E:\image, E:\image
Orientation=0,0,0,0
[ZIP WRITE]
InputImageFile=3.fpx,4.fpx, 1.fpx,2.fpx
ServiceCode=102,102,102,102
ServiceName=ZIP Writing, ZIP Writing, ZIP Writing, ZIP Writing
OutputImageFile=3 .jpg,2.jpg,1jpg,2.jpg
OutputDirectory=E:\image,E:\image, E:\image, E:\image,
Orientation=0,0,0,0
[FLOPPY DISK WRITE]
InputImageFile=3.fpx,4.fpx, 1.fpx,2.fpx
ServiceCode=203,203,203,203
ServiceName=FLOPPY Writing, FLOPPY Writing, FLOPPY Writing, FLOPPY Writing
OutputImageFile-3.jpg,2.jpg, 1.jpg,2.jpg
OutputDirectory=E:\image, E:\image, E:\image, E:\image
Orientation=0,0,0,0
[JAZZ WRITE]
InputImageFile=3.fpx,4.fpx,1.fpx,2.fpx
ServiceCode=402,402,402,402
ServiceName=JAZZ Writing, JAZZ Writing, JAZZ Writing, JAZZ Writing
OutputImageFile-3.jpg,2.jpg,1.jpg,2.jpg
OutputDirectory=E:\image, E:\image, E:\image, E:\image
Orientation=0,0,0,0
[Invoice]
OrderID: 97
Tracking Number: PICPIT0009798
Roll ID:
Store ID: 0
Store Name : <unknown>,<unknown>,<unknown>
Member ID: 3HS8ETVBP9
Date: 08/12/1998 14:42:26.000
Item: Adult's Photo T-Shirt (Extra large), Photo Reprints
   (4×6 inch reprints f,
Photo Reprints (4×6 inch reprints f
Roll: album, album, album, album
Frame: 2.fpx,3.fpx,1.fpx,4.fpx
Quantity: 1,3,1,2
Price : $19.99, $0.99, $0.99, $4.99
Total : $19.99, $2.97, $0.99, $9.98
Item Sub-Total: $0.00
Shipping & Handling: $0.00
Tax: $0.00
Total Amount: $120.00
CyberCash Autorization Code:
Customer Transaction ID: 980626221700153
Customer Transaction Number:
[text]
OrderID: 97
Tracking Number: PICPIT0009798
Roll ID:
Store ID: 0
Store Name: <unknown>,<unknown>,<unknown>
Member ID: 3HS8ETVBP9
Date: 08/12/1998 14:42:26.000
```

Order Details:

| Item | Roll | Frame | Quant. | Price | Total |
|---|---|---|---|---|---|
| Adult's Photo T-Shirt (Extra large) | album | 2.fpx | 1 | $19.99 | $19.99 |
| Photo Reprints (4 × 6 inch reprints f | album | 3.fpx | 3 | $0.99 | $2.97 |
| Photo Reprints (4 × 6 inch reprints f | album | 1.fpx | 1 | $0.99 | $0.99 |
| Photo Reprints (5 × 7 inch enlargemen | album | 4.fpx | 2 | $4.99 | $9.98 |
| Item Sub-Total: | | | | | $0.00 |
| Shipping & Handling: | | | | | $0.00 |
| Tax: | | | | | $0.00 |
| Total: | | | | | $0.00 |

CyberCash Authorization Code:
Customer Transaction ID: 980626221700153
Customer Transaction Number:
  The GLS Order File (for the Kiosk sub-system 400)
parameters include:
  a first tag [Kiosk] indicating the order is generated by the
     Kiosk sub-system 400/600 using the GLS 100 order file
     format; and an [invoice] section is added to capture the invoice information. These parameters are extracted from the unformatted [text] section so the GLS 100 can more easily process them.

The [INPUT] tag specifies the input media for the Kiosk machine. There can be only one input with one or multiple outputs. The [OUTPUT] tag specifies the output device(s) for the kiosk order file. The [PRINT] specifies the attributes for printing on the Frontier printer.

1.1.1 GLS 100 Upload Requirements

When a user 1000 submits a roll of film, it is scanned and processed by the GLS 100. A .rol file is then generated. The images and this file are uploaded to the Image Center 700 via FTP. A sample of the current .rol file is shown as follows:

LabID: FSC
EnvelopeID: 651
RollID: FSC35198000651
NumberOfExposures: 1
Password: r7iu5a29
CustomerID: 1k
FirstName:
MiddleInitial:
LastName:
Email:
Addr1:
Addr2:
City:
State:
Country:
Zip:
Phone:
MediaName:
MediaType:
Expiration: 45
Retail ID : 2
Retail Name: FSCA 1.1.1 Parameters Description of .rol File The following key parameters in the .rol file are defined as follows:

LabId: Lab id
EnvelopID: The id on the film envelope
RollID : This is the unique roll id to access the roll of film on the net
Password: This is password to access the roll of film on the net
Expiration: The number of days that digital images will be stored by the system
MediaType: Media type i.e. 1x fpx or 4x fpx image.

As set forth above, the GLS 100 has been described as a separate functional entity. The functionality that represents the GLS 100 could also be built-in to a hardware suite or could be loaded into a hardware suite as an article of manufacture or as a propogated signal.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A computer-implemented method, comprising:

receiving images in a first plurality of different image file formats from a first plurality of different media, and further receiving a plurality of user-generated service requests;

converting the received images, thereby creating converted image files that correspond to a common image file format;

carrying out image processing on the converted image files corresponding to the common image file format based on at least one corresponding user-generated service request;

converting the processed image files, thereby creating output image files, each of which corresponds to one of a second plurality of different image file formats; and outputting the output image files to at least one of a second plurality of different media.

2. The computer-implemented method of claim 1, wherein the first plurality of different image file formats include at least one of: FPX (1Base), FPX (4Base), JPG, Exif-JPG, Exif-TIFF, TIFF, BMP, COS order file, FUJI-DPC order file, Fuji order file specification, GIF, Digital Print Order Format (DPOF), PhotoCD, and PICT.

3. The computer-implemented method of claim 1, wherein the first plurality of different media include at least one of: CD-R (CD-R74 with CD-ID bar-code), Floppy Disk (FD) (1.44 MB with DOS and Mac standard format), PC card, Smart Media, Compact Flash, Zip Drive (100 MB and 250 MB with DOS/Windows and Mac standard), Jaz Drive (1 GB and 2 GB), and HiFD (200 MB Floppy Disk).

4. The computer-implemented method of claim 1, wherein the image processing, when executed, includes at least one of: color correcting selected images for red, green, and blue (RGB) and density; zooming; cropping; previewing corrected images; rotating images; panning images; and automatically scanning an entire roll of film.

5. The computer-implemented method of claim 1, wherein the second plurality of different image file formats includes FPX (4base), JPG (4Base), and JPG (1Base).

6. The computer-implemented method of claim 1, wherein the second plurality of different media includes at least one of: CD-R (CD-R74), FD (1.44 MB with DOS/Windows), Zip Drive (100 MB and 250 MB with DOS/Windows), and Jaz Drive (1 GB and 2 GB).

7. The computer-implemented method of claim 1, wherein the plurality of user-generated service requests are received via a plurality of screen displays.

8. The computer-implemented method of claim 7, wherein the plurality of screen displays includes at least one of a new order, order list, image display, customer information, and administration screen display.

9. The computer-implemented method of claim 1, wherein the images are received from a user who is network connected to a system performing said computer-implemented method.

10. The computer-implemented method of claim 9, wherein the user is remotely connected via a remote kiosk, image center, and/or remote terminal.

11. The computer-implemented method of claim 1, wherein copies of at least one of the received images, converted image files, processed image files, and output image files are stored by said computer-implemented method, when performed.

12. The computer-implemented method of claim 1, further comprising:

including at least one of the received images in combination with a service request in an order file.

13. A method comprising:

inputting an image in a first image file format, and a service request;

converting the input image, thereby creating a converted image file that corresponds to a common image file format;

executing image processing on the converted image file corresponding to the common image file format based on the input service request;

converting the processed image file, thereby creating an output image file that corresponds to a second image format, the second image file format being chosen from a plurality of image file formats based on the input service request; and outputting the output image file in a medium chosen from a plurality of media based on the input service request.

14. The method of claim 13, wherein the inputting step is operable to input an image in any of a plurality of image file formats, the plurality of image formats including at least one of: FPX, JPG, Exif-JPG, Exif-TIFF, TIFF, BMP, COS order file, FUJI-DPC order file, Fuji order file specification, GIF, Digital Printer Order Format (DPOF), PhotoCD, and PICT.

15. The method of claim 13, wherein the plurality of image file formats from which the second file format is chosen includes at least one of: FPX (4Base), JPG (4Base), and JPG (1Base).

16. The method of claim 13, wherein the executing image processing step includes executing one or more of the following functions: correcting color red-green-blue (RGB) values; correcting color density; zooming; cropping; rotating an image; panning an image; automatically scanning a roll of film; and previewing a corrected image.

17. The method of claim 16, further comprising:
choosing the functions to be executed by the image processing step based on the input service request.

18. The method of claim 13, wherein the inputting step inputs the service request as part of an order file.

19. The method of claim 13, wherein the inputting step inputs the image and service request via a network to a system, which is configured to perform at least one of the converting steps, the executing image processing step, and the outputting step.

20. The method of claim 19, wherein the inputting step inputs the image and service request via the network using at least one of a kiosk, image center, and terminal.

21. The method of claim 13, wherein the inputting step includes,
generating a text order file that includes the service request and identifies an image to be processed according to the service request; and
inputting the order file with the identified image.

22. A kiosk comprising:
one or more image input devices for inputting one or more images;
a service request input device for inputting one or more service requests corresponding to the one or more images;
a first processing device for creating a text order file based on the one or more images and the corresponding one or more service requests, and sending the one or more images and the text order file to a remote second processing device,
wherein:
the text order file includes a unique order identifier, which is used by the second processing device to create a unique directory in the second processing device for storing the one or more images and the text order file sent by the first processing device, and
the text order file indicates to the second processing device one or more types of image processing to be performed on each of the one or more images by the second processing device to satisfy the corresponding one or more service requests.

23. The kiosk of claim 22, further comprising:
one or more output devices for outputting the one or more images after the second processing device has performed image processing on the one or more images.

24. The kiosk of claim 23, wherein
the one or more output devices include a plurality of output devices, each of which is associated with one or more attributes,
the service request input device allows a user to specify an output device in the one or more service requests, and
the first processing device includes in the order file, one or more attributes associated with the specified output device, thereby indicating to the second processing device to perform one or more types of image processing corresponding to the one or more attributes.

25. The kiosk of claim 24, wherein
the one or more attributes include an output image file format associated with the output device, thereby indicating to the second processing device to convert an image file format of at least one image to the output image file format.

26. The kiosk of claim 22, wherein
the service request input device allows the user to specify one of a plurality of output media in the service requests, each of the output media being associated with one or more attributes, and
the first processing device includes in the order file, the one or more attributes associated with the specified output medium, thereby indicating to the second processing device to perform one or more types of image processing corresponding to the one or more attributes.

27. The kiosk of claim 26, wherein the specified output medium is at least one of: a digital storage device, a print medium, and a network connection.

28. The kiosk of claim 27, further comprising an output device operable to output at least one of the images on the specified medium.

29. The kiosk of claim 27, wherein the first image processing device includes customer information in the order file, wherein the customer information comprises at least one of: user identifier, location identifier, transaction identifier, transaction time, price, and method of payment.

30. The kiosk of claim 29, wherein the customer information indicates an address for delivering the specified output medium.

31. The kiosk of claim 27, wherein the specified output medium is a print medium, and the attributes include at least one of: size, orientation, colors, border information, and paper type.

32. The kiosk of claim 27, wherein the specified output medium is a digital storage device, and the attributes include at least one of: image file format, image file directory, and orientation.

33. The kiosk of claim 27, wherein the performed types of image processing include at least one of: image cropping, image rotation, image panning, color density correction, and converting image file format.

34. The kiosk of claim 27, wherein
the service request input device allows the user to input a preference corresponding to the one or more attributes, and
the order file associates the preference with the one or more attributes, thereby indicating to the second processing device to perform image processing to make at least one image consistent with the preference.

35. The kiosk of claim 34, wherein the attributes include a print size, and the service request input device allows the user to input the preference by choosing from a plurality of available print sizes corresponding to the specified output medium, the chosen print size being included in the order file.

36. The kiosk of claim 22, wherein the unique order identifier is used as a directory name for the directory to be created in the second processing device.

37. The kiosk of claim 22, wherein
the second processing device is configured to execute image processing software.

38. The kiosk of claim 22, wherein
the second processing device, which is remote from the kiosk and configured to execute image processing software, and
the kiosk further comprises a communicative link for sending the images and order file to the second processing device.

39. A system comprising:
an input terminal for inputting one or more images and one or more service requests corresponding to the images, the input terminal creating a text order file correlating the one or more images to the one or more service requests, respectively; and
a processing device for receiving the one or more images and the corresponding text order file, the processing device being configured to
execute image processing software that performs image processing on one or more image files, which correspond to a common image file format and represent the one or more images, based on the corresponding one or more service requests, and
convert the common image file format of the one or more processed image files, thereby creating one or more output image files corresponding to an output image file format; and
an output device for outputting the one or more output image files.

40. The system of claim 39, wherein the executed image processing software is configured to:
receive the one or more images in a first image file format from the input terminal;
convert the one or more images from the first image file format into the common image file format, thereby creating the one or more image files;
perform image processing on the one or more image files corresponding to the common image file format based on the one or more service requests; and
convert the one or more processed image files into the output image files for outputting the processed one or more images.

41. The system of claim 40, wherein
the input terminal allows a customer to input a service request by choosing at least one of a type of output media and a type of output device for outputting the images, the input terminal including in the order file an attribute associated with the customer's choice, and
the executed image processing software executes image processing corresponding to the attribute.

42. The system of claim 41, wherein the included attribute identifies at least one of: output image file format, size, orientation, color information, border information, and print paper type.

43. The system of claim 39, wherein the order file identifies a name of a directory into which the processing device stores the images and order file received from the input terminal.

44. The system of claim 39, wherein the input terminal is a kiosk, which is remote from the processing device.

45. The system of claim 44, further comprising a network for communicatively linking the kiosk and the processing device.

* * * * *